(12) United States Patent
Arahira

(10) Patent No.: US 8,331,798 B2
(45) Date of Patent: Dec. 11, 2012

(54) OPTICAL M-ARY MODULATOR

(75) Inventor: Shin Arahira, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 742 days.

(21) Appl. No.: 12/457,739

(22) Filed: Jun. 19, 2009

(65) Prior Publication Data
US 2010/0067923 A1 Mar. 18, 2010

(30) Foreign Application Priority Data

Sep. 16, 2008 (JP) ................................. 2008-236614

(51) Int. Cl.
*H04B 10/04* (2006.01)
(52) U.S. Cl. ........ 398/188; 398/185; 398/183; 398/198; 359/279
(58) Field of Classification Search .................. 398/188, 398/185, 183, 198, 184; 359/279
See application file for complete search history.

(56) References Cited

U.S. PATENT DOCUMENTS

| | | | | |
|---|---|---|---|---|
| 5,023,947 A * | 6/1991 | Cimini et al. | ................. | 398/202 |
| 5,223,967 A * | 6/1993 | Udd | ................. | 398/139 |
| 2002/0015206 A1* | 2/2002 | Hakimi et al. | ............... | 359/161 |
| 2005/0100351 A1* | 5/2005 | Yuan et al. | ................... | 398/214 |
| 2009/0047017 A1* | 2/2009 | Ikeda et al. | ..................... | 398/43 |

OTHER PUBLICATIONS

Kawanishi, T. et al., "80 Gb/s DQPSK modulator", Technical Digest of OFC 2007. OWH5, 2007.
Morioka, T. et al., "Ultrafast optical multi/demultiplexer utilising optical Kerr effect in polarisation-maintaining single-mode fibres", Electronics Letters, vol. 23, No. 9, pp. 453-454, 1987.
Jinno, M. et al, "Nonlinear Sagnac interferometer switch and its applications", IEEE Journal of Quantum Electronics, vol. 28, No. 4, pp. 875-882, 1992.
Arahira, S. et al, "Modified NOLM for Stable and Improved 2R Operation at Ultra-High Bit Rates", IEICE Transactions on Communications, vol. E89-B, No. 12, pp. 3296-3305, 2006.

* cited by examiner

*Primary Examiner* — M. R. Sedighian
(74) *Attorney, Agent, or Firm* — Rabin & Berdo, P.C.

(57) ABSTRACT

An optical m-ary modulator includes an optical loop forming a polarization maintaining closed optical path. A loop input-output unit splits linearly polarized input signal light into a first component and a second component and feeds the first and second components into the optical loop in opposite directions. A pair of phase modulators modulate the first and second components according to respective control signals. The loop input-output unit recombines the modulated first and second components. The optical phase bias unit creates a phase difference between the first and second components so that they combine to form an m-ary modulated optical signal. Since the first and second components travel around the same optical path, when they recombine their phases are correctly aligned, making the modulator immune to environmental effects and permitting the use of high-speed optical modulation techniques.

13 Claims, 14 Drawing Sheets

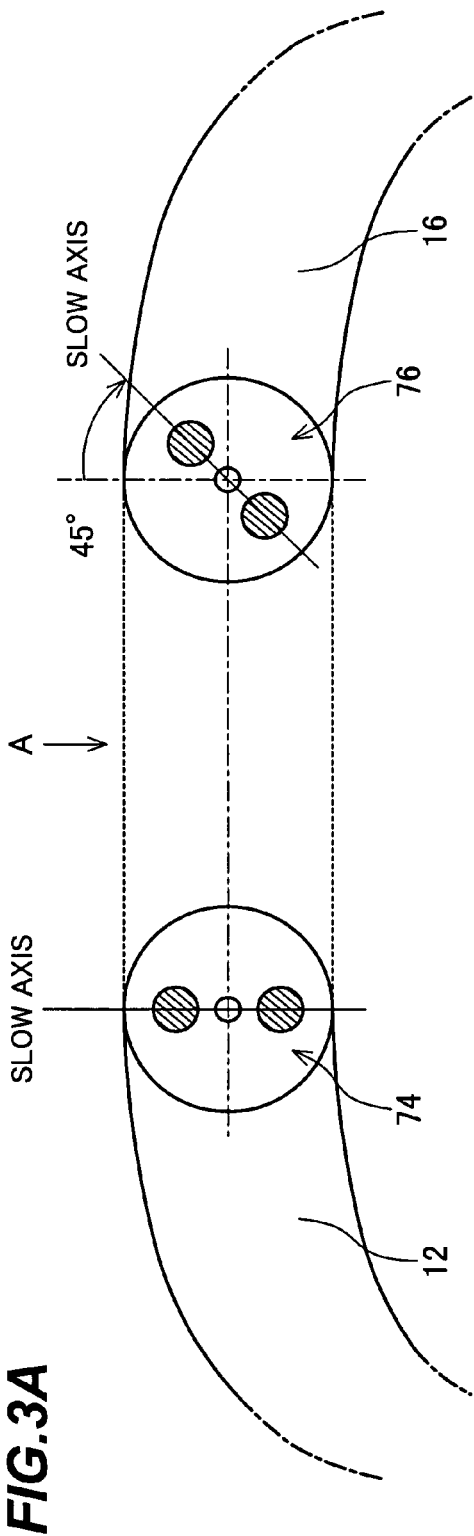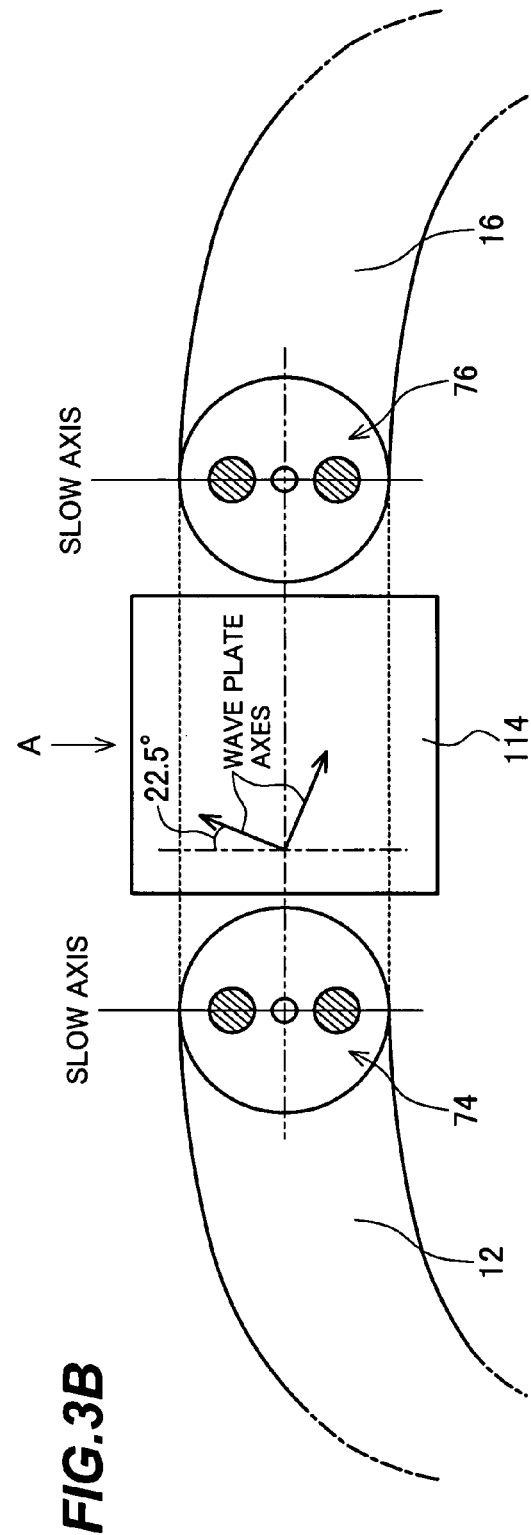
FIG.3A
FIG.3B

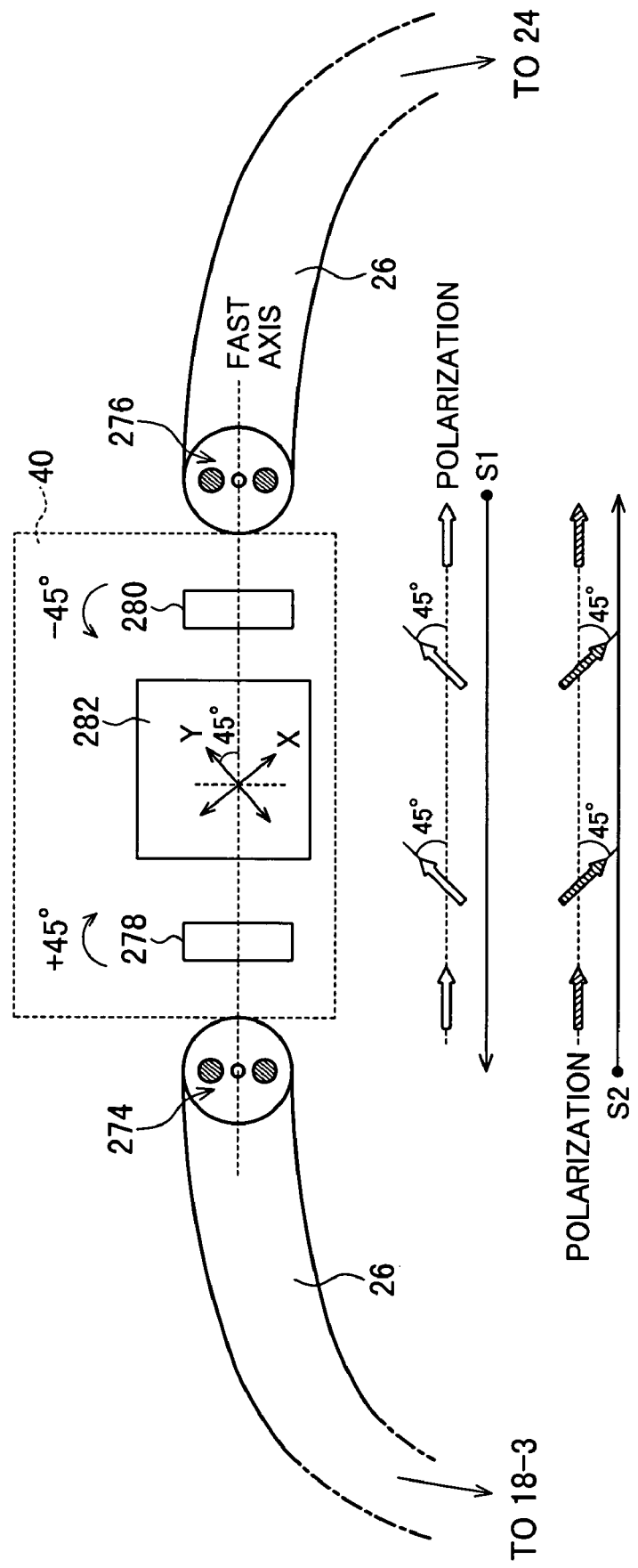

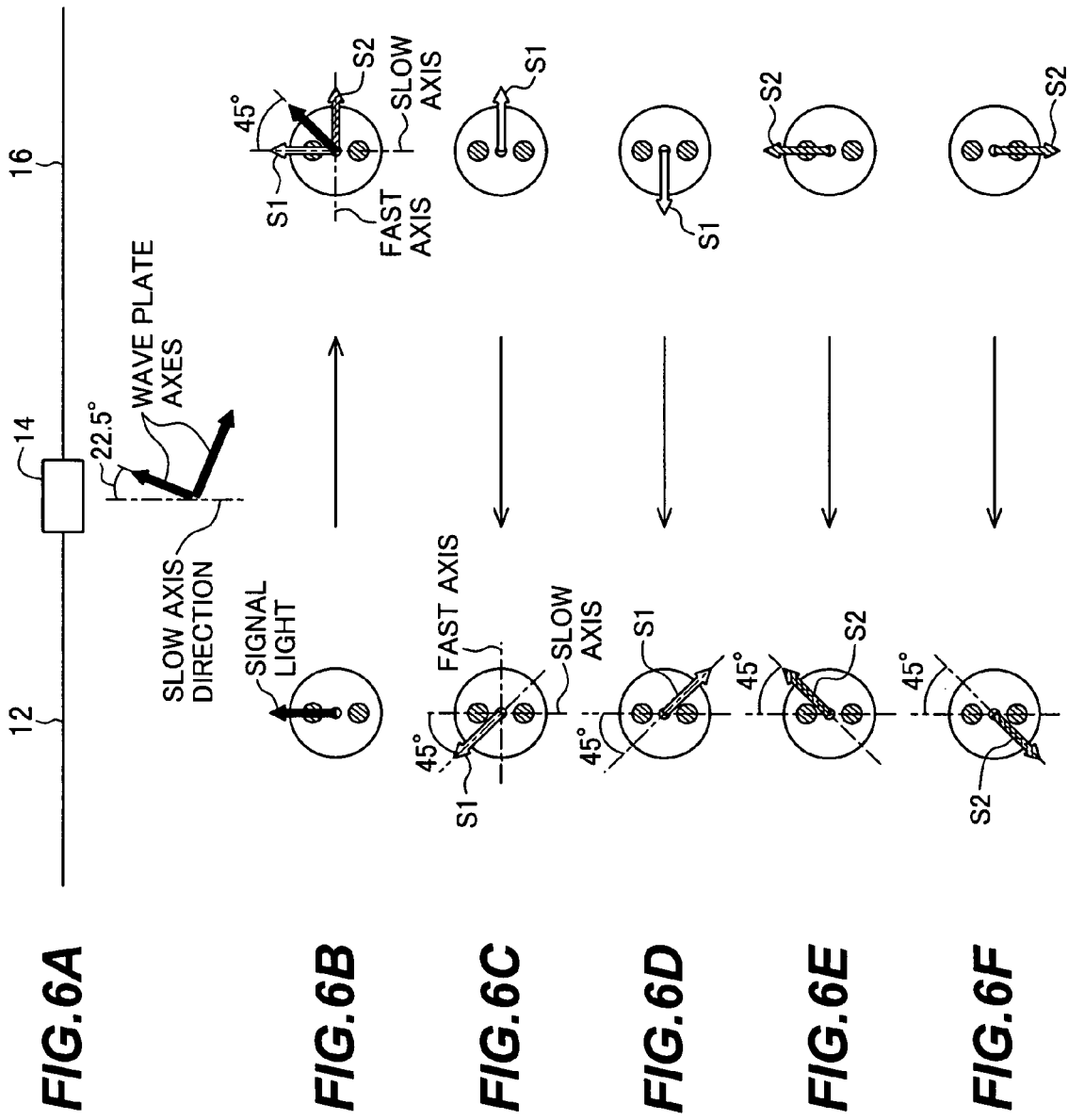

OPTICAL M-ARY MODULATOR

BACKGROUND OF THE INVENTION

1. Field of the Invention

The present invention relates to an optical modulator that modulates light with light to generate an m-ary optical signal for use in, for example, long-haul high-capacity fiber-optic communication, where m is an integer greater than two.

2. Description of the Related Art

Due to the pervasive spread of the Internet, the need for long-haul large-capacity optical fiber communications has been increasing. Communication capacity is being enlarged in two ways: by using wavelength division multiplexing (WDM) to increase the number of simultaneously transmittable channels, and by increasing the transmission rate in each channel.

M-ary modulation, which is already in use in mobile radio communication systems, is now attracting attention as one possible means for increasing the capacity and range of optical communication. Many researchers are currently studying its possible application to optical fiber communication systems.

The two major optical communication systems that have been put into practice or are under study are amplitude shift keying (ASK) or on-off keying (OOK) modulation, in which the signal allocated to each time slot has either a weak ('0') or strong ('1') intensity, and binary phase shift keying (BPSK) modulation, in which the signal allocated to each time slot has a phase shift of either 0 or $\pi$ radians. In both of these modulation systems, only one bit (two possible values) can be transmitted at once.

A typical m-ary modulation scheme is quadrature phase shift keying (QPSK). In QPSK, the phase of the signal in a single time slot may shifted by 0, $\pi/2$, $\pi$, or $3\pi/2$ radians, enabling the transmission of two bits (four possible values) at once.

If used in optical fiber communications, QPSK modulation would allow twice as much data to be transmitted in the same frequency band as by OOK or BPSK modulation, resulting in increased communication capacity and improved spectral utilization efficiency. Conversely, since QPSK uses only half as much bandwidth as OOK or BPSK modulation to transmit the same amount of data, when QPSK is used in a WDM system, the wavelength channel spacing can be reduced, increasing the communication capacity and again improving the spectrum utilization efficiency. The reduced bandwidth would also make the transmitted signal less vulnerable to waveform distortion due to group velocity dispersion in the optical fiber, so another advantage of QPSK would be an increased communication range.

The optical QPSK modulators now under study are typically electro-optical (E/O) systems that convert electrically modulated signals to optically modulated signals. An exemplary system of this type is described by Kawanishi et al. in '80 Gb/s DQPSK modulator', *Technical Digest of OFC 2007*, OWH5, 2007.

Gb/s is an abbreviation for gigabits per second. The abbreviations Gbps and Gbits/s are also used.

The system described by Kawanishi et al. employs Mach-Zehnder (MZ) interferometric lithium niobate ($LiNbO_3$) modulators, which exploit the Pockels effect in an $LiNbO_3$ crystal. Two such modulators (MZA and MZB) are used to generate a pair of 40-Gb/s BPSK signals, which are then combined in an optical coupler (MZC) to generate an 80-Gb/s QPSK signal.

In this and other known electro-optical QPSK modulators, the bit rate of the QPSK signal is limited by the operating speed of the component E/O modulators. In order to obtain faster bit rates, it is necessary to increase the operating speed of the electronic devices that generate the electrically modulated signals as well as the electro-optic conversion speed of the E/O modulators themselves. The state of the art in commercially available devices is currently about 50 Gbps, limiting the QPSK signal to about 100 Gbps.

To generate QPSK signals beyond the limits of electronic devices and E/O optical modulators, it would be preferable to use an all-optical modulator in which the signal light is modulated by an optical modulating signal or control signal.

A preferred optical modulation method uses the optical Kerr effect in an optical fiber. The optical Kerr effect occurs when the refractive indexes of a fiber vary due to propagation of light with high intensity in the fiber. The response speed of the optical Kerr effect is on the order of a few femtoseconds.

An exemplary method of fabricating an ultra high-speed optical modulator or switch by utilizing the fiber-optic Kerr effect has been described by Morioka et al. in 'Ultrafast optical multi/demultiplexer utilising optical Kerr effect in polarisation-maintaining single-mode fibres', *Electronic Letters*, Vol. 23, No. 9, pp. 453-454, 1987. This type of optical fiber has two axes, referred to as the slow axis and fast axis, in a plane orthogonal to the longitudinal axis of the fiber. Linearly polarized light propagating through the fiber experiences different effective indexes of refraction depending on whether the light is polarized parallel to the fast axis or the slow axis.

The Kerr medium used by Morioka et al. includes two polarization-maintaining optical fibers spliced end-to-end with mutually orthogonal slow axes so that the birefringence of the two fibers cancels out. In the experiment described by Morioka et al., linearly polarized OOK-modulated control light pulses and unmodulated probe light pulses were coupled into this medium, respectively polarized parallel to and at a 45° angle to the fiber axes. A pulse of probe light propagating through the medium together with a pulse of control light had its polarization plane rotated by the Kerr effect, which produced a phase difference $\phi$ between the probe light components polarized parallel to and orthogonal to the control light. The intensity of the control light could be adjusted to create a phase shift $\phi$ of $\pi$ radians and thus a polarization rotation of 90°. When no control light pulse was present, there was no net phase shift and the polarization plane of the probe light pulse was not rotated.

This experiment demonstrates that the fiber-optic Kerr effect can transform an OOK or ASK modulation pattern into a phase modulation pattern and suggests that the fiber-optic Kerr effect could be used to realize an all-optical BPSK modulator operating at a bit rate of at least several hundred gigabits per second. It is easy to infer that a QPSK optical signal could be generated by combining two BPSK signals generated in this way in an optical coupler such as coupler MZC described by Kawanishi et al.

Generating an optical QPSK signal by combining two optical BPSK signals, however, requires precise control of the phase relationship between the two optical BPSK signals. In the typical case in which the two optical BPSK signals are modulated with phases of 0 and $\pi$, for example, an ideal optical QPSK signal is not obtained unless the phase difference between them is precisely $\pi/2$.

The phase of the individual optical BPSK signals is not determined solely by the electrical modulating signal used by Kawanishi et al. or the optical control signal used by Morioka et al.; the phase is also shifted by the optical lengths of the individual paths taken by the optical signals.

If the optical modulation scheme proposed by Morioka et al. is used, an optical fiber with a length of from several tens of meters to several kilometers is required to obtain an adequate optical phase modulation effect from control light of a practical intensity. This length is millions or billions of times the wavelength of the optical signal. Precise control of the relative phases of two optical signals propagating through fibers of this length would be extremely difficult; the necessary phase control equipment would have to respond at high speed with high precision to measured phase changes, and would also have to compensate for phase drift due to temperature changes and other environmental factors. Such a phase control system would be prohibitively complex and expensive.

Thus while it is easy to conceive of an optical QPSK modulator using an optical coupler such as coupler MZC in Kawanishi et al. to combine two optical BPSK signals generated by the optical modulation technique described by Morioka et al., a practical optical QPSK modulator of this type would be extremely difficult to build and would require complex and very costly optical phase control apparatus.

SUMMARY OF THE INVENTION

An object of the present invention is to provide an all-optical m-ary modulator that is stable even when operating at high speed and does not require complex or high-precision control apparatus.

The invention provides an optical m-ary modulator including an optical loop forming a closed polarization maintaining optical path, a loop input-output unit, a pair of phase modulators disposed in the optical loop, and an optical phase bias unit.

The loop input-output unit receives linearly polarized input signal light; splits the input signal light into a first component and a second component and feeds the first and second components into the optical loop in mutually opposite directions.

The phase modulators receive respective control signals representing respective binary data sequences. While the first and second components of the signal light travel around the optical loop in opposite directions, one phase modulator uses one optical control signal to modulate the optical phase of the first component. The other phase modulator uses the other optical control signal to modulate the optical phase of the second component.

After the first and second components have traveled around the optical loop, the loop input-output unit recombines them to generate a returning optical signal.

The optical phase bias unit creates a relative optical phase difference between the first and second components of the signal light. The optical phase bias unit may be disposed in the optical loop, in which case the first and second components pass through the optical phase bias unit before being recombined. Alternatively, the optical phase bias unit may be optically connected to the loop input-output unit by a separate propagation path and receive the returning optical signal from the loop input-output unit, in which case the first and second components pass through the optical phase bias unit after being recombined.

In either case, after the first and second components have passed through the optical phase bias unit and have been recombined, they are output as an m-ary modulated optical signal.

The optical m-ary modulator may also include an optical path separator that separates the returning optical signal from the input signal light, and an optical bandpass filter that rejects returning control light.

Since the phase modulators use optical control signals to modulate the signal light, they can operate at high speed, not limited by the operating speed of electronic components.

Since the first and second components propagate around the same optical loop, their mutual phase relationship automatically remains the same except for the intentional phase differences created by the optical phase bias unit and the phase modulators. No extra phase control apparatus is necessary.

The desired phase relationship is moreover maintained despite ambient temperature changes and other environmental changes, so the operation of the optical m-ary modulator is extremely stable.

BRIEF DESCRIPTION OF THE DRAWINGS

In the attached drawings:

FIGS. 3A and 3B schematically illustrate alternative structures of the polarization converter at point A in FIG. 1;

FIG. 5 schematically illustrates an exemplary structure of the optical phase bias unit in FIG. 1;

FIGS. 6A to 6F schematically illustrate the operation of the polarization converter at point A in FIG. 1;

DETAILED DESCRIPTION OF THE INVENTION

Figure 1:
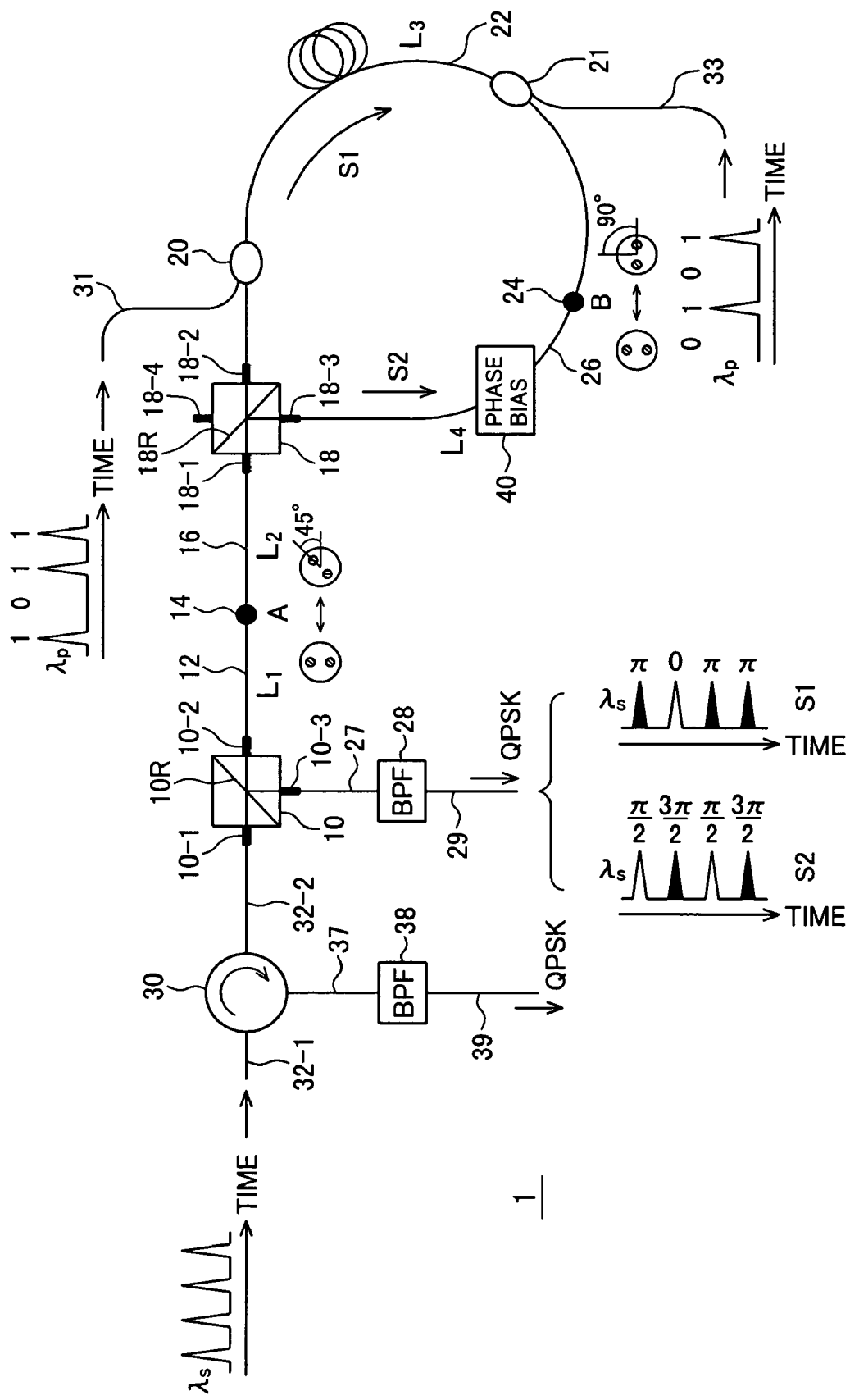
FIG. 1 schematically illustrates the structure of an optical m-ary modulator according to a first embodiment of the invention.

Embodiments of the invention will now be described with reference to the attached drawings, in which like elements are indicated by like reference characters. All of the embodiments are optical QPSK modulators (m=4), but it will be appreciated that the embodiments can be modified to create optical m-ary modulators where m has other values.

First Embodiment

Referring to FIG. 1, the optical m-ary modulator 1 in the first embodiment comprises a first polarization splitting-combining module 10, a first polarization maintaining optical fiber 12, a first polarization converter 14, a second polarization maintaining optical fiber 16, a second polarization splitting-combining module 18, a pair of optical couplers 20, 21, a third polarization maintaining optical fiber 22, a second polarization converter 24, a fourth polarization maintaining optical fiber 26, and an optical phase bias unit 40.

The third and fourth polarization maintaining optical fibers 22, 26 form a polarization maintaining optical closed loop. The first and second polarization maintaining optical fibers 12, 16 form an optical input-output path.

The first polarization splitting-combining module 10, which functions as the optical path separator, is a type of polarizing beam splitter-combiner or polarizing prism having a first input-output facet or port 10-1 connected to one end of an input optical fiber 32-2 for input of signal light of wavelength $\lambda_s$, a second input-output facet or port 10-2 disposed opposite to the first input-output port 10-1 and connected to one end of the first polarization maintaining optical fiber 12, and a third input-output facet or port 10-3 from which the modulated signal light is output.

The second polarization splitting-combining module 18, which functions as the loop input-output unit, has a first input-output facet or port 18-1 connected to one end of the second polarization maintaining optical fiber 16, a second input-output facet or port 18-2 disposed opposite to the first input-output port 18-1 and connected to one end of the third polarization maintaining optical fiber 22, a third input-output facet or port 18-3 connected to one end of the fourth polarization maintaining optical fiber 26, and a fourth input-output facet or port 18-4 disposed opposite to the third input-output port 18-3, for output of polarization crosstalk light.

The fourth input-output port 18-4 is included for convenience in the following description, to explain how polarization crosstalk is removed. In practice, the fourth input-output port 18-4 is not used and may be omitted, or if present, may have a simplified structure with no fiber pigtail, optical connector, or other optical input-output interface.

The other ends of the first and second polarization maintaining optical fibers 12, 16 are interconnected through the first polarization converter 14 at position A in FIG. 1.

The third polarization maintaining optical fiber 22 extends from the second input-output port 18-2 of the second polarization splitting-combining module 18 to the second polarization converter 24 at position B. The third polarization maintaining optical fiber 22 is a nonlinear optical fiber in which control light of wavelength $\lambda_p$ produces a phase shift in the signal light of wavelength $\lambda_s$ by the optical Kerr effect. The signal light enters the third polarization maintaining optical fiber 22 in one direction from the second polarization splitting-combining module 18 and in the other direction the fourth polarization maintaining optical fiber 26, to which the third polarization maintaining optical fiber 22 is connected through the second polarization converter 24. A first optical control signal from a first control input port or fiber 31 enters the third polarization maintaining optical fiber 22 through optical coupler 20. A second optical control signal from a second control input port or fiber 33 enters the third polarization maintaining optical fiber 22 through optical coupler 21. The first and second optical couplers 20, 21 are connected in such a way that the first and second optical control signals propagate through the third polarization maintaining optical fiber 22 in mutually opposite directions.

The fourth polarization maintaining optical fiber 26 extends from the third input-output port 18-3 of the second polarization splitting-combining module 18 to the second polarization converter 24.

The optical couplers 20, 21 are preferably polarization maintaining optical couplers. The first optical control signal, which is linearly polarized, enters from control input port 31 through the first optical coupler 20 and propagates through the third polarization maintaining optical fiber 22 and fourth polarization maintaining optical fiber 26 to the third input-output port 18-3 of the second polarization splitting-combining module 18. The second optical control signal, which is also linearly polarized, enters from control input port 33 through the second optical coupler 21 and propagates through the third polarization maintaining optical fiber 22 to the second input-output port 18-2 of the second polarization splitting-combining module 18.

Although the first and second optical control signals propagate in opposite directions, they have the same polarization plane in the third polarization maintaining optical fiber 22, both matching the polarization plane of the signal light components that propagate through the third polarization maintaining optical fiber 22. In the description below, aside from crosstalk, all signal light and control light that propagates through the third polarization maintaining optical fiber 22 is polarized parallel to its slow axis.

Panda fiber is one preferred type of optical fiber that may be used for the polarization maintaining optical fibers 12, 16, 22, 26 and in the optical couplers 20, 21. In panda fiber, the polarization maintaining property is obtained by stressing the fiber core.

Figure 2:
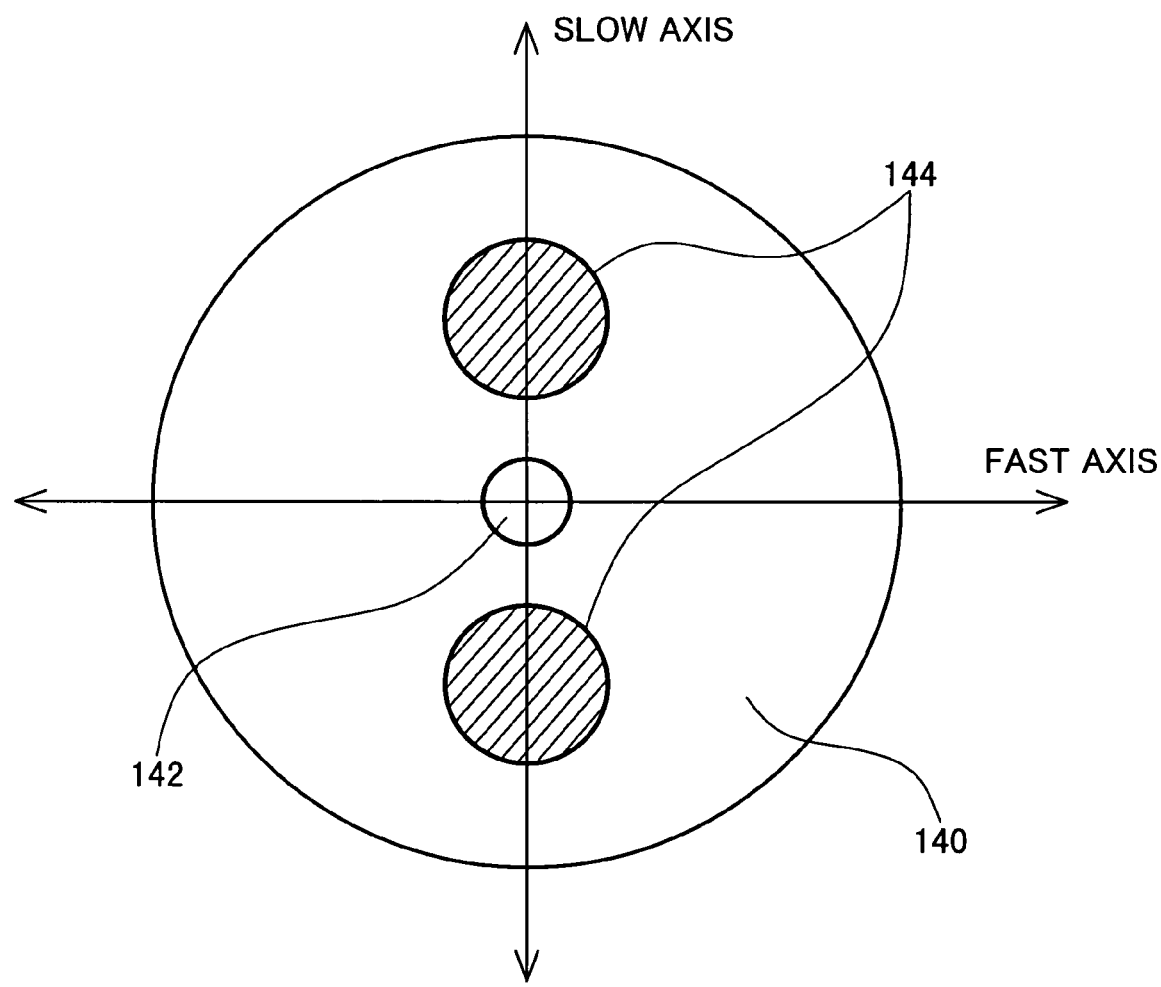
FIG. 2 is a schematic cross sectional view of a polarization maintaining optical fiber.

Referring to FIG. 2, a panda fiber has, for example, a silicon dioxide ($SiO_2$) clad 140 surrounding a germanium-oxide-doped $SiO_2$ core 142. Two boron-oxide-doped stressing members 144 are formed in the clad 140 on opposite sides of the core 142. Stress created by the stressing members 144 produces a slow axis passing through the centers of the stressing members 144 and a fast axis orthogonal to the slow axis. The refractive index of the stressing members 144 is higher than the refractive index of the clad 140, so light with an electric vector oscillating parallel to the slow axis experiences a higher equivalent index of refraction than light with an electric vector oscillating parallel to the fast axis. Because of this asymmetry of the index of refraction, the polarization plane of polarized light input to the fiber is maintained as the light propagates through the fiber. In particular, if light polarized parallel to the slow (or fast) axis is input to the fiber, then in theory, at least, only light polarized parallel to the slow (or fast) axis will be output from the fiber.

Referring again to FIG. 1, the first and second polarization splitting-combining modules 10, 18 have respective reflecting surfaces 10R or 18R that reflect light polarized in one direction and transmit light polarized in the orthogonal direction. Modules of this type, referred to as polarizing beam splitter-combiners or polarizing prisms, are commercially available. The transmitted light is conventionally referred to as the p-component and the reflected light as the s-component. In the polarization splitting-combining modules 10, 18, the p-component is polarized parallel to the slow axes of the attached polarization maintaining optical fibers, and the s-component is polarized parallel to the fast axes of the attached polarization maintaining optical fibers.

In the first polarization splitting-combining module 10, for example, the p-component or slow-axis component incident on the first input-output port 10-1 exits at the second input-output port 10-2, the s-component or fast-axis component incident from the second input-output port 10-2 exits at the third input-output port 10-3, and the p-component or slow-axis component incident from the second input-output port 10-2 exits at the first input-output port 10-1. No s-component enters the first polarization splitting-combining module 10 through the first input-output port 10-1.

The first and second polarization splitting-combining modules 10, 18 may be, for example, polarizing beam splitters of the thin film type or polarizing prisms of the birefringent crystal type.

The above-described relation of the s- and p-components to the fast and slow axes of polarization maintaining optical fibers may be interchanged without impairing the effects produced of the invention. That is, the fibers may be attached so that the p-component is polarized parallel to the fast axis and the s-component is polarized parallel to the slow axis.

The polarization converter 14 through which the first and second polarization maintaining optical fibers 12, 16 are interconnected changes the relation of the plane of polarization of incident light to the fast and slow axes of the optical fibers by 45°.

Referring to FIG. 3A, polarization converter 14 may be configured by joining the end 74 of the first polarization maintaining optical fiber 12 to the end 76 of the second polarization maintaining optical fiber 16 in a fused splice such that their slow axes are oriented at a mutual angle of 45°.

Alternatively, polarization converter 14 may be configured as in FIG. 3B by coupling the first and second polarization maintaining fibers 12, 16 with their slow axes aligned in the same direction, but inserting a half wavelength plate 114 into the coupling between the fiber ends 74, 65, with one optical axis of the half wavelength plate 114 oriented at a 22.5° angle with respect to the slow axes of the fibers. This configuration will be assumed in the description below.

Figure 4A:
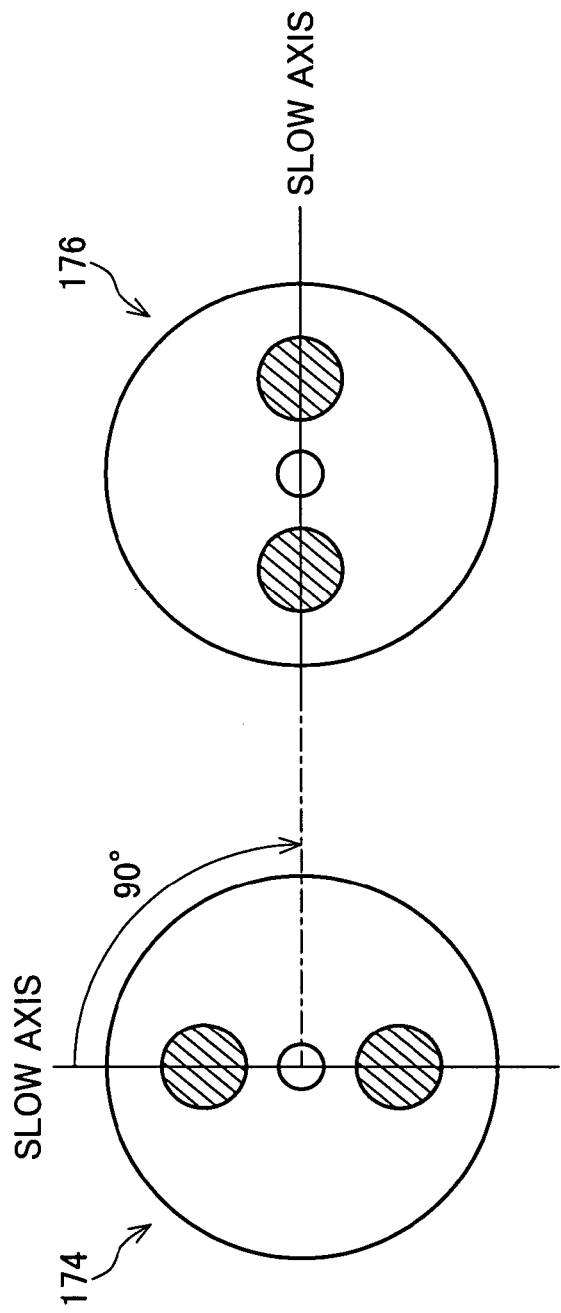
FIGS. 4A and 4B schematically illustrate an exemplary structure of the polarization converter at point B in FIG. 1.
Figure 4B:
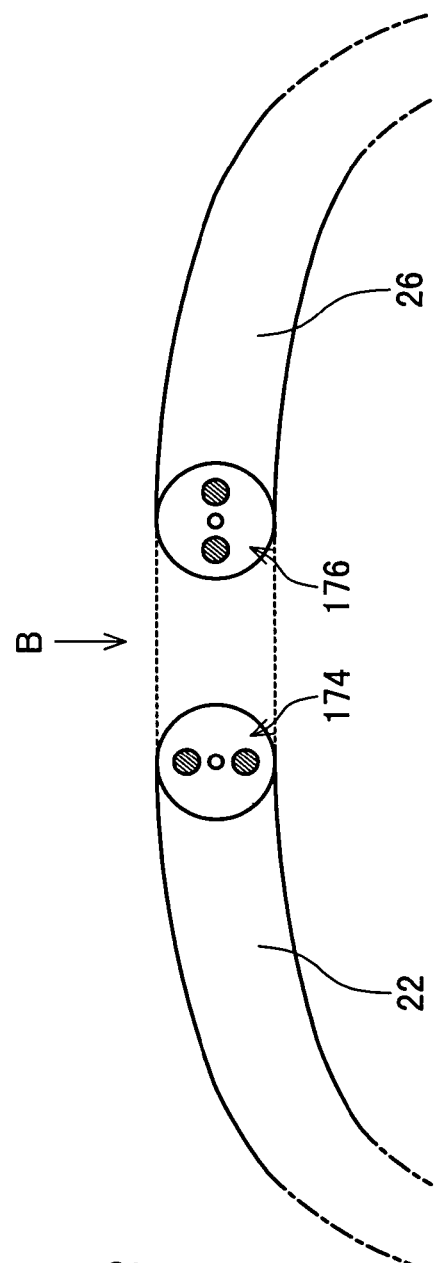

The polarization converter 24 through which the third and fourth polarization maintaining optical fibers 22, 26 are interconnected changes the relation of the plane of polarization of incident light to the fast and slow axes of the fibers by 90°. Referring to FIGS. 4A and 4B, this polarization converter 24 may be configured by joining the end 174 of the third polarization maintaining optical fiber 22 to the end 176 of the fourth polarization maintaining optical fiber 26 in a fused splice such that their slow axes are oriented at a mutual angle of 90°. Alternatively, the second polarization converter 24 may be configured by coupling the third and fourth polarization maintaining fibers 22, 26 with their slow axes aligned in the same direction, but inserting a half wave plate into the coupling with the optical axes of the half wave plate oriented at a 45° angle with respect to the slow axes of the fibers (this alternative configuration is not illustrated).

The optical path $L_1$ from the second input-output port 10-2 of the first polarization splitting-combining module 10 to the first polarization converter 14 has a physical length, which will be, denoted $L_1$. Similarly the optical path $L_2$ from the first polarization converter 14 to the first input-output port 18-1 of the second polarization splitting-combining module 18 has a physical length $L_2$; the optical path $L_3$ from the second input-output port 18-2 of the second polarization splitting-combining module 18 to the second polarization converter 24 has a physical length $L_3$; the optical path $L_4$ from the second polarization converter 24 to the third input-output port 18-3 of the second polarization splitting-combining module 18, excluding the optical phase bias unit 40, has a physical length $L_4$.

In FIG. 1 these lengths $L_1$, $L_2$, $L_3$, and $L_4$ are the lengths of the respective polarization maintaining fibers 12, 16, 22, and 26. In a variation of the first embodiment, however, any or all of the first, second, and fourth polarization maintaining optical fibers 12, 16, 26 may be replaced by free space paths, since these optical paths $L_1$, $L_2$, $L_4$ play no role in the optical Kerr effect that produces the optical phase shift that modulates the signal light.

The optical couplers 20, 21 that feed control light into the third polarization maintaining optical fiber 22 may be standard three-decibel (3-dB) couplers that split or combine light in a 1:1 ratio, or they may be wavelength division multiplexing (WDM) couplers designed to split and combine light of the wavelengths of the control light and signal light.

The optical phase bias unit 40 may be inserted at an arbitrary point in the loop formed by the third and fourth polarization maintaining optical fibers 22, 26. In FIG. 1, the optical phase bias unit 40 is inserted into the fourth polarization maintaining optical fiber 26.

The optical phase bias unit 40 may be structured as shown, for example, in FIG. 5, comprising a first polarization rotator or Faraday rotator 278 that rotates the polarization plane of linearly polarized light by +45°, a second polarization rotator or Faraday rotator 280 that rotates the polarization plane of linearly polarized light by −45°, and a birefringent medium, more specifically a quarter wave plate 282, with X and Y axes oriented at 45° angles to the fast and slow axes of the fourth polarization maintaining optical fiber 26, these three components being inserted between two ends 274, 276 of the fourth polarization maintaining optical fiber 26.

Referring again to FIG. 1, in addition to the components described above, as peripheral components, the optical m-ary modulator 1 in the first embodiment has an optical circulator 30 and two optical bandpass filters (BPFs) 28, 38.

The optical circulator 30 receives input signal light through an input optical fiber 32-1 at a first input-output facet or port, and outputs this light from a second input-output facet or port into the optical fiber 32-2 leading to the first input-output port 10-1 of the first polarization splitting-combining module 10. The optical circulator 30 also receives modulated returning signal light at its second port and outputs this light from a third input-output facet or port through an output optical fiber 37 to optical bandpass filter 38.

Optical bandpass filter 38 selects a predetermined wavelength band centered on the signal wavelength $\lambda_s$, blocks light of other wavelengths, including the control light wavelength $\lambda_p$, and outputs light in the selected wavelength band through an output optical fiber 39.

The other optical bandpass filter 28 performs a similar function: it receives modulated signal light from the third input-output port 10-3 of the first polarization splitting-combining module 10 through an output optical fiber 27, selects a predetermined wavelength band centered on the signal wavelength $\lambda_s$, blocks light of other wavelengths, including the control light wavelength $\lambda_p$, and outputs light in the selected wavelength band through another output optical fiber 29.

As explained below, the light output from both optical bandpass filters 28, 38 is QPSK modulated signal light.

The operation of the optical m-ary modulator 1 in the first embodiment will now be described. First the propagation of unmodulated signal light will be described.

Unmodulated signal light of wavelength $\lambda_s$ enters the optical circulator 30 through input fiber 32-1 and is coupled into input fiber 32-2, through which the light reaches the first input-output port 10-1 of the first polarization splitting-combining module 10.

The signal light is an optical pulse train with pulses of uniform peak intensity spaced at uniform temporal intervals. The pulse period is equal to twice the reciprocal of the data rate (the bit rate) of the desired QPSK signal. For example, for a 10-Gbps QPSK optical signal, the pulse period should be two hundred picoseconds (200 ps), corresponding to a pulse rate of 5 GHz.

The signal light received at the first input-output port 10-1 of the first polarization splitting-combining module 10 is linearly polarized in the p-component plane. The light exits the second input-output port 10-2 of the first polarization splitting-combining module 10 polarized parallel to the slow axis of the first polarization maintaining optical fiber 12, and propagates to the first polarization converter 14.

The first polarization converter 14 is redrawn schematically in FIG. 6A and its effect on the unmodulated signal light is shown in FIG. 6B. Signal light entering the first polarization converter 14 from the first polarization maintaining optical fiber 12 is indicated by the upward-pointing vector on the left in FIG. 6B. Signal light exiting the first polarization converter 14 and entering the second polarization maintaining optical fiber 16 is indicated on the right in FIG. 6B.

If the first polarization converter 14 is configured as in FIG. 3B, then when the signal light passes through the half wavelength plate 114, its polarization is rotated by 45° to a plane oriented at a 45° angle to the slow axis of the second polarization maintaining optical fiber 16. Alternatively, if the first polarization converter 14 is configured as in FIG. 3A, the polarization plane of the signal light remains unchanged but the slow axis of the second polarization maintaining optical fiber 16 is rotated by 45° with respect to the slow axis of the first polarization maintaining optical fiber 12. In either case, the signal light entering the second polarization maintaining optical fiber 16 from the first polarization converter 14 is linearly polarized in a plane oriented at a 45° angle to the slow axis of the second polarization maintaining optical fiber 16.

The signal light maintains this state of polarization as it propagates through the second polarization maintaining optical fiber 16 to the first input-output port 18-1 of the second polarization splitting-combining module 18. As shown in FIG. 6B, the signal light can be regarded as consisting of two components S1 and S2: the S1 component is linearly polarized parallel to the slow axis of the second polarization maintaining optical fiber 16; the S2 component is linearly polarized parallel to the fast axis of the second polarization maintaining optical fiber 16. Because of the 45° angle between the polarization plane of the signal light and the slow axis of the second polarization maintaining optical fiber 16, the intensity ratio of the S1 component to the S2 component is 1:1.

In the second polarization splitting-combining module 18, the S1 and S2 components are separated and output from the second input-output port 18-2 and third input-output port 18-3, respectively, into the closed optical loop formed by the third and fourth polarization maintaining optical fibers 22, 26, so that the S1 and S2 components propagate around the loop in opposite directions.

The S1 component leaves input-output port 18-2 polarized parallel to the slow axis of the third polarization maintaining optical fiber 22 and maintains this state of polarization as it propagates up to the second polarization converter 24. Because of the 90° conversion effected by the second polarization converter 24, the S1 component enters the fourth polarization maintaining optical fiber 26 polarized parallel to its fast axis, and maintains this polarization up to the optical phase bias unit 40.

Referring again to FIG. 5, as the S1 signal light enters the optical phase bias unit 40 from end 276 of the fourth polarization maintaining optical fiber 26, passage through the second Faraday rotator 280 rotates the plane of polarization of the light by −45°, so that it is polarized parallel to an axis (the Y axis in FIG. 5) of the quarter wave plate 282. The light S1 propagates through the quarter wave plate 282 with this polarization, then passes through the first Faraday rotator 278, which rotates the polarization plane of the light by +45°, restoring the original polarization. The light S1 then reenters the fourth polarization maintaining optical fiber 26 at end 274 and continues to propagate toward the second polarization splitting-combining module 18 with its plane of polarization aligned with the fast axis of the fourth polarization maintaining optical fiber 26.

Arriving back at the second polarization splitting-combining module 18, the S1 component is routed from input-output port 18-3 to input-output port 18-1 and continues to propagate through the second polarization maintaining optical fiber 16 with its polarization plane parallel to the fast axis of the fiber 16. The first polarization converter 14 rotates the polarization plane by 45° so that the S1 components is polarized at a 45° angle to the fast and slow axes of the first polarization maintaining optical fiber 12 as it propagates from the first polarization converter 14 to input-output port 10-2 of the first polarization splitting-combining module 10.

The S2 component leaves input-output port 18-3 of the second polarization splitting-combining module 18 polarized parallel to the fast axis of the fourth polarization maintaining optical fiber 26 and enters the optical phase bias unit 40 from end 274 polarized in this state. Passage through the first Faraday rotator 278 rotates the plane of polarization of the light by +45°, so that the S2 component is polarized parallel to (in FIG. 5) the X axis of the quarter wave plate 282 orthogonal. The S1 and S2 components accordingly pass through the quarter wave plate 282 polarized parallel to different axes (the X-axis and the Y-axis) of the quarter wave plate 282. The S2 component then passes through the second Faraday rotator 280, which rotates its polarization plane by −45°, restoring the original polarization. The S2 component reenters the fourth polarization maintaining optical fiber 26 at end 276 and continues to propagate toward the second polarization converter 24 with its plane of polarization aligned with the fast axis of the fiber 26.

Because of the of the 90° conversion effected by the second polarization converter 24, the S2 component enters the third polarization maintaining optical fiber 26 polarized parallel to its slow axis, and maintains this polarization until it returns to the optical phase bias unit 40.

Arriving back at the second polarization splitting-combining module 18, the S1 component is routed from input-output port 18-2 to input-output port 18-1 and continues to propagate through the second polarization maintaining optical fiber 16 with its polarization plane parallel to the slow axis of the fiber 16. The first polarization converter 14 rotates the polarization plane by 45° so that the S1 components is polarized at a 45° angle to the fast and slow axes of the first polarization maintaining optical fiber 12 as it propagates from the first polarization converter 14 to input-output port 10-2 of the first polarization splitting-combining module 10.

Accordingly, the S1 and S2 components both arrive at input-output port 10-2 of the first polarization splitting-combining module 10 polarized at 45° angles to the p-component and s-component planes. The first polarization splitting-combining module 10 splits each of the S1 and S2 components into two equal parts, one polarized in the s-component plane, parallel to the fast axis of the optical fiber 12, and one polarized in the p-component plane, parallel to the slow axis. The parts of the S1 and S2 components polarized in the s-component plane exit from input-output port 10-3 and are output through optical bandpass filter 28. The parts of the S1 and S2 components polarized in the p-component plane exit from input-output port 10-2 and are output through the optical circulator 30 and optical bandpass filter 38.

While propagating around the optical loop, the S1 and S2 components also undergo phase modulation due to control light pulses. Before this phase modulation is considered, it is necessary to see whether a phase difference arises between the S1 and S2 components due to the optical lengths of the paths they follow.

The optical length of a path can be obtained by multiplying its physical length by its refractive index. When multiple optical media with different refractive indexes are cascaded, the optical path length is the sum of the optical path lengths of the multiple optical media. The total length of the optical fibers in the optical path followed by the S1 component from when it leaves the first polarization converter 14 until it returns to the first polarization converter 14 is therefore given by expression (1) below, where $n_s$ represents the slow-axis refractive index of the polarization maintaining optical fibers, and $n_f$ represents the fast-axis refractive index.

$$n_s L_2 + n_s L_3 + n_f L_4 + n_f L_2 \tag{1}$$

Similarly, the total optical length of the fibers in the optical path on which the S2 component propagates away from and then back to the first polarization converter 14 is given by expression (2) below.

$$n_f L_2 + n_f L_4 + n_s L_3 + n_s L_2 \tag{2}$$

Expressions (1) and (2) are equal, showing that the total optical fiber path length in the second, third, and fourth polarization maintaining optical fibers 16, 22, 26 is the same for both the S1 and S2 components.

When the S1 and S2 components return from the second polarization converter 24 to the first polarization splitting-combining module 10 on path $L_1$, they are both polarized at 45° angles to the fast and slow axes of the first polarization maintaining optical fiber 12, so they propagate at equal speeds on this part of their optical path. Accordingly, no optical path-length difference arises between the S1 and S2 components of the signal light due to their passage through the polarization maintaining optical fibers 12, 16, 22, 26.

Neither is any optical path length difference created in the polarization splitting-combining modules 10, 18, although a detailed explanation will be omitted.

When the S1 and S2 components pass through the optical phase bias unit 40, however, one component (e.g., the S2 component) is polarized parallel to the X-axis of the quarter wave plate 282 while the other component (e.g., the S1 component) is polarized parallel to the Y-axis, as was illustrated in FIG. 5. The birefringence of the quarter wave plate 282 therefore produces a phase difference of $\pi/2$ radians between the S1 and S2 components, equivalent to one quarter of their wavelength $\lambda_s$.

The phase modulating effect of the control light will now be described. When the S1 and S2 components enter the optical loop, there is no phase difference between them. For simplicity, the optical phase of the S1 and S2 components entering the optical loop will be considered as optical phase zero, representing a '0' bit data value. An optical signal phase of $\pi$ radians will represent a '1' bit data value.

The first and second optical control signals are intensity-modulated (OOK) optical signals of wavelength $\lambda_p$ with a data bit rate equal to half the bit rate of the desired QPSK modulated signal. To obtain a 10-Gbps QPSK modulated optical signal, for example, 5-Gbps optical control signals are used.

The first and second optical control signals are both linearly polarized parallel to the slow axis of the third polarization maintaining optical fiber 22 in the optical loop, and their pulse timing is adjusted to coincide with the pulse timing of the signal light traveling in the same direction in the optical loop. Alternatively, since the optical Kerr effect induced by the third polarization maintaining optical fiber 22 causes a walk-off effect between the control light and signal light due to group velocity dispersion (GVD), the optical control signals may be input with a certain timing offset between their pulses and the signal light pulses traveling in the same direction.

For simplicity, it will be assumed that the first and second optical control signals are have an infinite extinction ratio, so if a control pulse representing a '1' bit has unit peak intensity, a control pulse representing a '0' bit has substantially zero peak intensity.

When a pulse of the first or second optical control signal represents a '0' bit, since its intensity is substantially zero, it causes substantially no phase shift occurs in the signal light, which continues to propagate with optical phase zero.

When a pulse of the first or second optical control signal representing a '1' bit is present, a phase modulation or phase shift due to the optical Kerr effect occurs in the signal light pulse traveling together with the control pulse in the same direction. The peak intensity or '1' bit intensity of the first and second optical control signals is set at a value such that the cumulative phase shift in the S1 or S2 pulse propagating in the same direction in the third polarization maintaining optical fiber 22 is $\pi$ radians.

It will be assumed that the first and second optical couplers 20, 21 are positioned at similar distances from the ends of the third polarization maintaining optical fiber 22, and that the first and second optical control signals have the same duty ratio, wavelength, and mark ratio. It is thought that these assumptions will coincide with practice in most applications. Under these assumptions, the peak intensity or '1' bit intensity necessary for a $\pi$ shift is the same in both the first and second optical control signals, and over a long series of pulses, both control signals will normally have the same average intensity.

The control light also has a phase modulating or phase shifting effect on signal pulses traveling in the opposite direction. In "Nonlinear Sagnac interferometer switch and its applications" by M. Jinno and T. Matsumoto, *IEEE J. Quantum Electronics*, Vol. 28, No. 4, pp. 875-882, 1992, and elsewhere, it is shown that the amount of phase shift due to control light propagating in the opposite direction is determined by the average intensity of the control light. Given the above assumptions, when the third polarization maintaining fiber 22 has a practical length of several tens of meters to several kilometers, the phase modulation or phase shift of signal light due to control light propagating in the opposite direction is determined by the average intensity of many hundreds or thousands of control pulses, a substantially constant proportion of which will represent '1' bits. The average intensity of the opposite-direction control light pulses encountered by each S1 and S2 signal pulse will therefore be substantially constant, and the resulting phase shift will be substantially the same for all S1 and S2 signal pulses.

If control light propagating in the reverse direction produces substantially the same phase shift in all signal pulses, and the same phase shift in both the S1 and S2 components, then this phase shift can be regarded as a constant factor similar to the phase shift due to the optical fiber path length, and can be disregarded. Only the phase shift due to the control light propagating in the same direction (the first optical control signal for the S1 component and the second optical control signal for the S2 component) need be considered.

If there is a difference in the duty ratio, frequency, or mark ratio of the first and second optical control signals, then the phase shifts produced in the S1 and S2 components by control light propagating in the opposite direction may not be the same, but if the difference is known, it can be compensated for by adjustment of the thickness of the birefringent medium in the optical phase bias unit 40.

The components of signal light returning from the optical loop to the first polarization converter 14 are shown on the right in FIGS. 6C to 6F, using vector notation to indicate the states on both sides of the first polarization converter 14, which is shown in FIG. 6A.

FIGS. 6C and 6D represent the S1 component of the light. In the second polarization maintaining optical fiber 16, this component is polarized parallel to the fast axis, the phase vector pointing right in FIG. 6C, for example, to indicate a pulse that representing a '0' data bit and pointing left in FIG. 6D to indicate a pulse that has been modulated to represent a '1' bit.

FIGS. 6E and 6F similarly represent the S2 component of the light. In the second polarization maintaining optical fiber 16, the S2 component is polarized parallel to the slow axis, the phase vector pointing up in FIG. 6E to indicate a pulse that represents '0' data and pointing down in FIG. 6F to indicate a pulse that represents '1' data.

The amplitudes (vector lengths) of the S1 and S2 components are identical.

These polarized S1 and S2 components exit the first polarization converter 14 and propagate back through the first polarization maintaining optical fiber 12. When they reenter the first polarization maintaining optical fiber 12 through the end 74, they are respectively polarized in planes oriented at a 45° counterclockwise angle (−45°) and a 45° clockwise angle (+45°) to the slow axis of the first polarization maintaining optical fiber 12. The vector notations in these states are shown on the left in FIGS. 6C and 6E.

Figure 7:
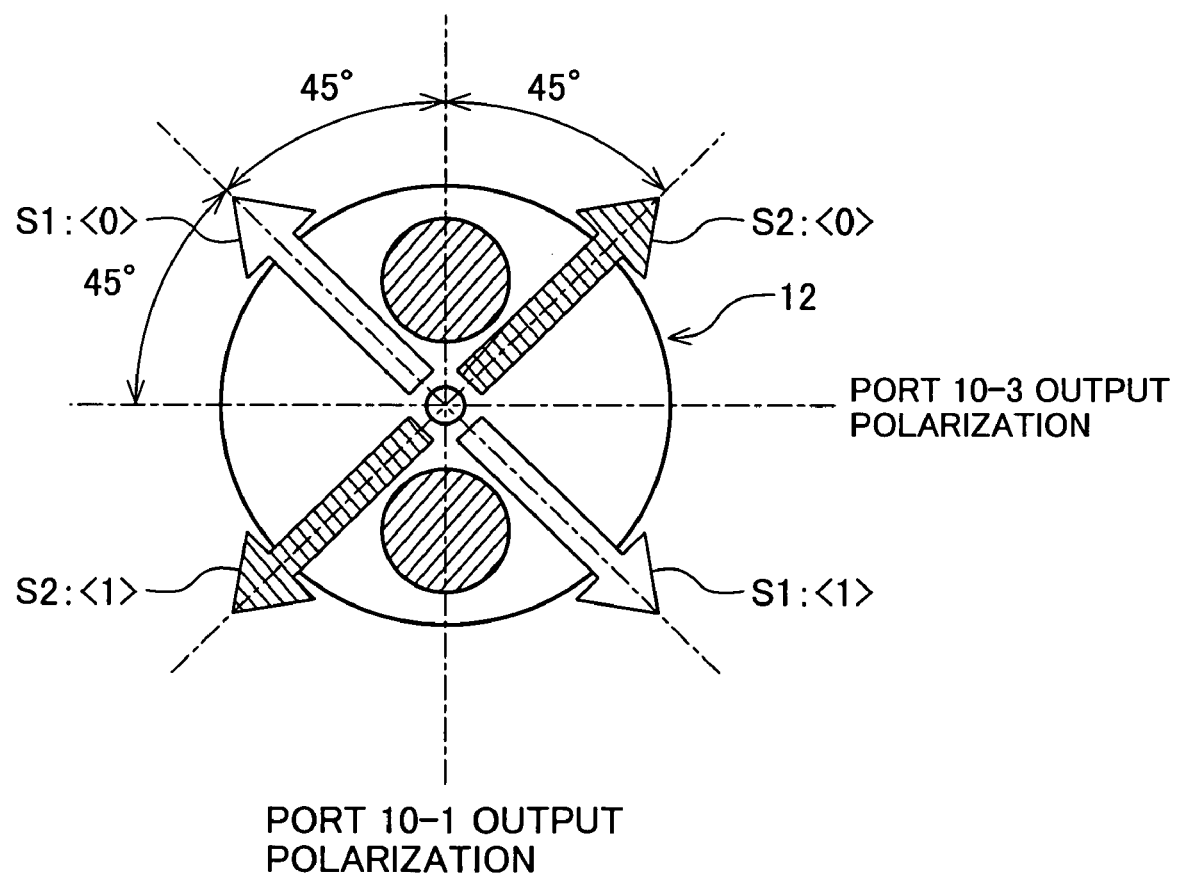
FIG. 7 schematically illustrates the components of modulated signal light propagating from point A to the left in FIG. 1.

The four vectors shown on the left in FIGS. 6C to 6F are shown collectively in the sectional view of the left end of the first polarization maintaining optical fiber 12 in FIG. 7 to indicate the polarization and phase states with which the modulated S1 and S2 components may arrive back at the first polarization splitting-combining module 10. Vectors pointing in opposite directions represent light polarized in the same plane but with opposite optical phases.

Each arriving S1 pulse and each arriving S2 pulse is split L into two components with mutually orthogonal polarization planes, one component being output from the first input-output port 10-1, the other component being output from the third input-output port 10-3 as explained above. The polarization planes of these output components coincide with the slow and fast axis of the first polarization maintaining optical fiber 12, respectively.

The part of the S1 component that exits the first polarization splitting-combining module 10 through the third input-output port 10-3 is a BPSK signal in which mutually opposite optical phases, separated by a phase angle of π radians, represent '1' and '0' bit values acquired from the first optical control signal. The part of the S2 component that exits the first polarization splitting-combining module 10 through the third input-output port 10-3 is a BPSK signal in which mutually opposite optical phases, separated by π radians, represent '1' and '0' bit values acquired from the second optical control signal. Both BPSK signals are polarized in the same plane when they leave the third input-output port 10-3.

In addition to the phase modulation due to the first and second optical control signals, there is also a phase difference of π/2 radians between the S1 and S2 components created by the optical phase bias unit 40 in the optical loop. Accordingly, if the '0' bit and '1' bit phases of the S1 component are represented by phase angles of 0 and π, for example, then the '0' bit and '1' bit phases of the S2 component are represented by phase angles of π/2 and 3π/2.

In the signal leaving port 10-3 of the first polarization splitting-combining module 10, if the waveform of the S1 component is represented as $\sin(kt)$ for a '0' bit or $\sin(kt+\pi)$ for a '1' bit, where k is a constant and t is a time variable, and the waveform of the S2 component is represented as $\sin(kt+\pi/2)$ for a '0' bit or $\sin(kt+3\pi/2)$ for a '1' bit, then the S1 and S2 components combine as follows, depending on the combination of the bit values they represent. The notation '01', for example, indicates a pulse in which the S1 component was modulated to represent a '1' bit and the S2 component represents a '0' bit. The letter denotes A is a constant equal to the square root of two.

'00': $\sin(kt+\pi/2)+\sin(kt)=A\sin(kt+\pi/4)$

'01': $\sin(kt+\pi/2)+\sin(kt+\pi)=A\sin(kt+3\pi/4)$

'11': $\sin(kt+3\pi/2)+\sin(kt+\pi)=A\sin(kt+5\pi/4)$

'10': $\sin(kt+3\pi/2)+\sin(kt)=A\sin(kt+7\pi/4)$

The S1 and S2 components thus combine to form a QPSK modulated signal with phases of π/4, 3π/4, 5π/4, and 7π/4 representing different two-bit values.

The formulas $\sin(kt+\pi/4)$ and $\sin(kt+5\pi/4)$ could also be used for the S1 component, and $\sin(kt+3\pi/4)$ and $\sin(kt+7\pi/4)$ for the S2 component, in which case the combined QPSK component has phases of 0, π/2, π, and 3π/2, matching the notation in FIG. 1.

This QPSK modulated signal propagates together with control light through output optical fiber 27 to optical bandpass filter 28, which passes the signal light component of wavelength $\lambda_s$ and blocks the control light component of wavelength $\lambda_p$. The $\lambda_s$ wavelength component is then output through output optical fiber 29 as the desired QPSK modulated signal.

In FIG. 1, the S1 and S2 components of the QPSK output signal are shown separate pulse trains for clarity, although they are actually combined into a single pulse train as explained above.

A QPSK signal with phases opposite to the above, that is, an optical m-ary modulated signal with negative logic, is output through the third input-output port of the optical circulator 30 and optical bandpass filter 38. This negative-logic signal can be used to monitor the quality of the positive-logic signal output through optical bandpass filter 28. If such monitoring is unnecessary, the optical circulator 30, optical fiber 37, optical bandpass filter 38, and optical fiber output optical fiber 39 may be omitted.

If wavelength division multiplexing (WDM) filters are used as the optical couplers 20 and 21, the first optical control signal light exits the optical loop through the second optical coupler 21 to control input port 33, and the second optical control signal light exits through the first optical coupler 20 to control input port 31. In this case no control signal light reaches the second polarization splitting-combining module 18, no control signal light is output from the first polarization splitting-combining module 10, and the optical bandpass filters 28, 38 may be omitted.

As described above, the optical m-ary modulator 1 in the first embodiment uses the optical Kerr effect to generate a QPSK optical signal, the data rate of which is limited only by the femtosecond-order response speed of the Kerr effect and may greatly exceed the limitations of electronic devices.

In addition, the optical m-ary modulator 1 is structured so that the path-length differences due to propagation through the birefringent polarization maintaining optical fibers automatically cancel out, which eliminates the need for the complex, high-precision phase control apparatus that would necessary in an optical m-ary modulator created by combining the cited prior art.

As the S1 and S2 components travel around the optical loop, they generate what are termed polarization crosstalk components with orthogonal polarization. The crosstalk components are polarized parallel to the fast axis of the third polarization maintaining optical fiber 22 and the slow axis of the fourth polarization maintaining optical fiber 26. In the second polarization splitting-combining module 18, the crosstalk components are routed to the fourth input-output port 18-4, so they are not mixed with the desired QPSK optical signal.

As a result, even if the third polarization maintaining optical fiber 22 is elongated to reduce the required peak intensity of the optical control signals, this will not lead to operational instability due to polarization crosstalk.

The first embodiment accordingly provides a highly stable m-ary optical modulator with characteristics that are not affected by changes in ambient temperature and other environmental factors or by polarization crosstalk.

This m-ary optical modulator can also tolerate a certain amount of optical wavelength drift, as long as the signal wavelength $\lambda_s$ remains in the passband of the optical passband filters 28, 38 and control wavelength $\lambda_p$ remains in their stopband, and the phase shift produced by the birefringence of the optical phase bias unit 40 remains substantially equal to the desired value, e.g., $\pi/2$.

In a variation of the first embodiment, the intensity of the second optical control signal is adjusted to produce a phase difference of $\pi/3$ radians between '0' and '1' bits, and the combined QPSK modulated signal represents two data bits with optical phase shifts of $0$, $\pi/3$, $2\pi/3$, and $\pi$. The optical control signals propagating in the opposite directions now produce different phase shifts in the S1 and S2 components, but the difference can be compensated for in the optical phase bias unit 40. If a variable medium such as a Babinet-Soleil compensator is used as the birefringent medium in the optical phase bias unit 40, an m-ary modulator that is flexibly applicable to a wide variety of modulation formats can be obtained.

In another variation of the first embodiment, one or both of the optical control signals is an ASK intensity modulated signal with three or more intensity levels. This variation can be used to produce an m-PSK output signal with more than four phase shifts (m>4).

Second Embodiment

A second and simpler embodiment of the invention will now be described with reference to FIG. 8 and FIGS. 9A to 9C.

Figure 8:
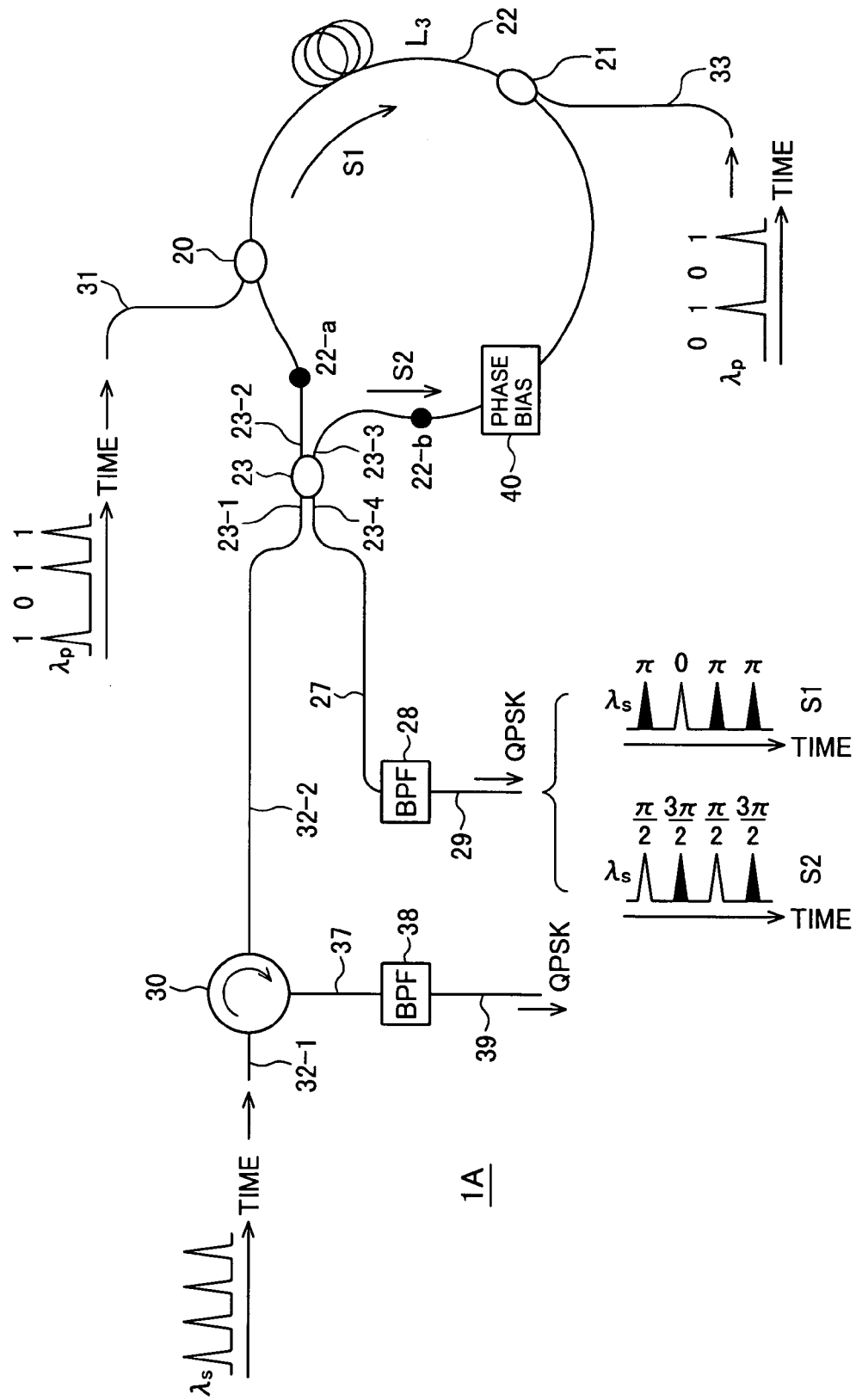
FIG. 8 schematically illustrates the structure of an optical m-ary modulator according to a second embodiment of the invention.
Figures 9A, 9B, 9C:
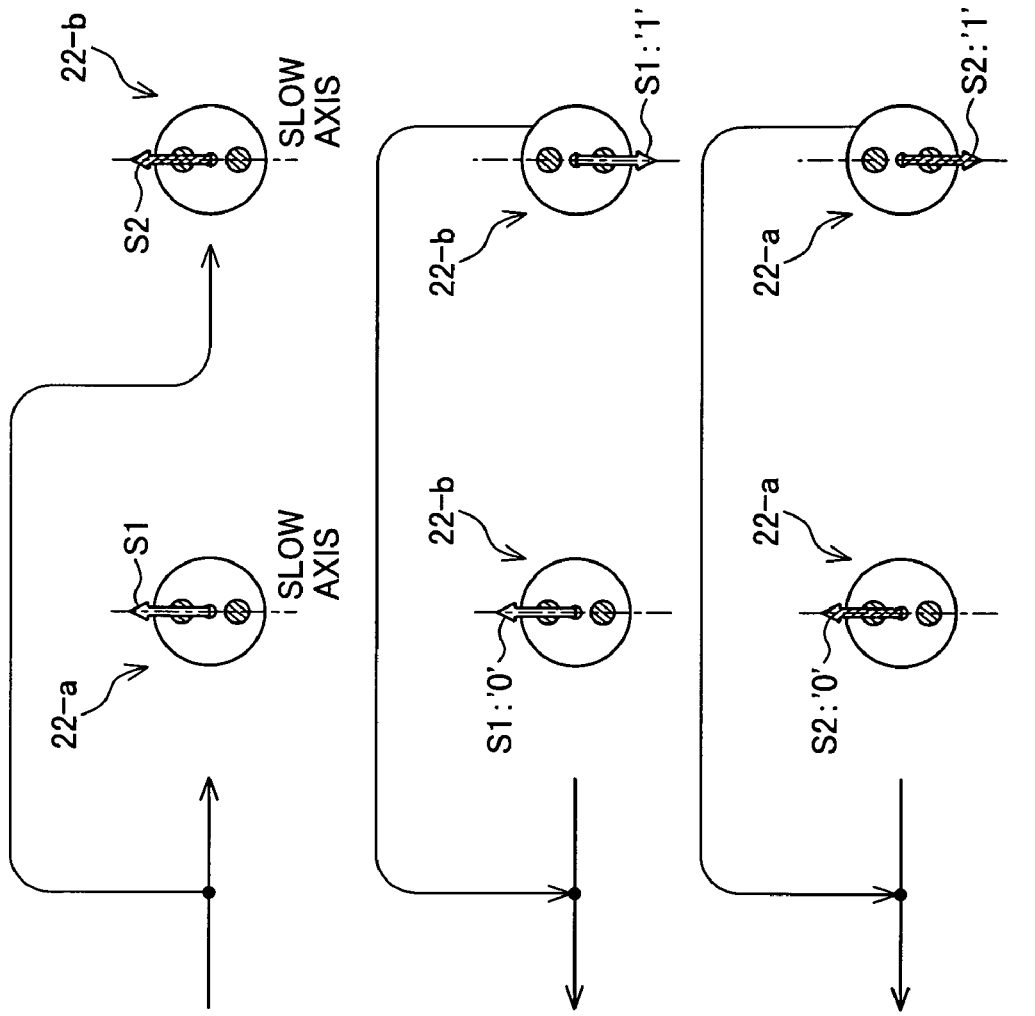
FIGS. 9A to 9C schematically illustrate the states of signal light entering and leaving the polarization maintaining two-by-two three-decibel coupler in FIG. 8.

FIG. 8 shows the configuration of the optical m-ary modulator 1A in the second embodiment. The polarization splitting-combining modules, the polarization converters, and the first, second, and fourth polarization maintaining optical fibers used in the first embodiment are eliminated, and a polarization maintaining 3-dB coupler 23 is added in their place. The optical loop is formed by the polarization maintaining 3-dB coupler 23 and the polarization maintaining optical fiber 22 in which the optical Kerr effect takes place.

The polarization maintaining 3-dB coupler 23 is a two-by-two three-decibel (2×2 3-dB) coupler having four input-output facets or ports 23-1 to 23-4 with respective fiber pigtails. Input-output ports 23-2 and 23-3 are connected at respective junctions or splices 22-a and 22-b to the polarization maintaining optical fiber 22.

Signal light entering the polarization maintaining 3-dB coupler 23 through the first input-output port 23-1 is split into two identical parts S1 and S2 with an optical intensity ratio of 1:1, and these parts S1, S2 are output through the second and third input-output ports 23-2, 23-3, respectively, with their polarization direction unchanged. In the reverse direction, light entering the polarization maintaining 3-dB coupler 23 through the second input-output port 23-2 or third input-output port 23-3 is split into two identical parts with an optical intensity ratio of 1:1 and these parts are output through the first and fourth input-output ports 23-1 and 23-4, respectively, with their polarization unchanged.

The fiber pigtails on the second and third input-output ports 23-2 and 23-3 of the polarization maintaining 3-dB coupler 23 and the two ends of the polarization maintaining optical fiber 22 are connected at junctions 22-a and 22-b with their fast axes mutually aligned and their slow axes mutually aligned. The optical phase bias unit 40 is inserted at an arbitrary point in the polarization maintaining optical fiber 22.

The other components of the optical m-ary modulator 1A are substantially as described in the first embodiment. Input optical fiber 32-2 is connected to the first input-output port 23-1 of the polarization maintaining 3-dB coupler 23, and output optical fiber 27 is connected to the fourth input-output port 23-4.

The operation of the optical m-ary modulator 1A will now be described, focusing on the points differing from the first embodiment.

In the optical m-ary modulator 1A, the S1 and S2 components of signal light are generated in the polarization maintaining 3-dB coupler 23. The unmodulated signal light input through optical fiber 32-2 to the first input-output port 23-1 of the polarization maintaining 3-dB coupler 23 is polarized parallel to the slow axis of the first input-output port 23-1, as shown at the extreme left in FIG. 9A. The S1 and S2 signal light components output through the second and third input-output ports 23-2 and 23-3 are linearly polarized in the same direction, parallel to the slow axes of ports 23-2 and 23-3. The S1 and S2 components accordingly enter the polarization maintaining optical fiber 22 at junctions 22-a and 22-b polarized parallel to the slow axis of the polarization maintaining optical fiber 22, as shown to the right of the arrows in FIG. 9A. The S1 and S2 components propagate through the polarization maintaining optical fiber 22 in opposite directions, maintaining their polarization parallel to the slow axis, as in the first embodiment.

The S1 component is modulated in phase by the first optical control signal in the polarization maintaining optical fiber 22 and propagates through junction 22-b to third input-output port 23-3 of the polarization maintaining 3-dB coupler 23, still maintaining its slow-axis polarization direction. The optical phase may be expressed as 0 or π according to the '0' or '1' bit value of the first control signal. In the vector notation in FIG. 9B, the S1 component at junction 22-b is indicated by an up vector for a '0' bit and a down vector for a '1' bit of the first control signal, and both vectors are shown on the left in FIG. 9B to represent the states with which the S1 component may leave fourth input-output port 23-4 of the polarization maintaining 3-dB coupler 23.

Similarly, the S2 component is modulated in phase by the second optical control signal in the polarization maintaining optical fiber 22 and propagates through junction 22-a to second input-output port 23-2 of the polarization maintaining 3-dB coupler 23, still maintaining its slow-axis polarization direction. Its optical phase may also be expressed as 0 or π according to the '0' or '1' bit value of the second control signal. In the vector notation in FIG. 9C, the S2 component at junction 22-a is indicated by an up vector for a '0' bit and a down vector for a '1' bit of the second control signal, and both vectors are shown on the left in FIG. 9C to represent the states with which the S2 component may leave fourth input-output port 23-4 of the polarization maintaining 3-dB coupler 23.

Because both the S1 and S2 components propagate with their polarization planes parallel to the slow axis of the polarization maintaining optical fiber 22, the total optical path lengths for the S1 and S2 components are identical. The size of the phase shifts produced by the first and second optical control signals traveling in the opposite directions to the signal light are also identical.

After traveling around the optical loop, the S1 and S2 components return to the polarization maintaining 3-dB coupler 23, enter ports 23-3 and 23-2, respectively, and are both split into two identical parts, each having half the intensity of the original component. The two parts are output from ports 23-1 and 23-4, respectively. The parts of the returning S1, S2 signals output from the fourth input-output port 23-4 are both polarized parallel to the slow axis of fourth input-output port 23-4, and have phases that vary by π according to the '1' or '0' bit value represented, as shown at the left in FIGS. 9B and 9C.

The optical phase of the parts of the S1 and S2 components output from fourth input-output port 23-4 will now be described. As in the first embodiment, the phase shifts occurring in the S1 and S2 components due to the optical path length of the polarization maintaining optical fiber 22 and the first and second optical control signals traveling in the opposite direction are identical and will be ignored.

A 2×2 polarization maintaining 3 dB coupler, however, inherently produces a phase shift of π/2 radians between the light input at the first input-output port 23-1 and output from the second input-output port 23-2 and the light input at the first input-output port 23-1 and output from the third input-output port 23-3, as described in Japanese Patent Application Publication No. 2004-309541, for example. A similar phase shift of π/2 radians occurs between light input at the second input-output port 23-2 and output from the fourth input-output port 23-4 and light input at the third input-output port 23-3 and output from the fourth input-output port 23-4. Accordingly, the polarization maintaining 3-dB coupler 23 produces a phase difference of π (=π/2×2) between the S1 and S2 components. This phase difference will also be ignored, because it only inverts the logic of one of the two BPSK modulated signals, and does not change the principle of operation of the QPSK modulator 1B.

As a result, port 23-4 of the polarization maintaining 3-dB coupler 23 outputs two BPSK signals in which the intensity modulation patterns of the first and second optical control signals are converted to phase modulation patterns as in the first embodiment. If the optical phase bias unit 40 were not present, the S1 and S2 components exiting the fourth input-output port 23-4 would both would be indistinguishable BPSK signals having phases of 0 and π.

The optical phase bias unit 40, however, operating as described in the first embodiment, creates a relative phase difference of π/2 radians between the S1 and S2 components, so that if one has phases of 0 and π, the other has phases of π/2 and 3π/2. The S1 and S2 components therefore leave fourth input-output port 23-4 of the polarization maintaining 3-dB coupler 23 as a combined QPSK optical signal with phases representing four possible two-bit data values, as described in first embodiment. The optical phase bias unit 40 may be inserted at an arbitrary point in the optical loop to produce this effect.

The QPSK signal output from first input-output port 23-1 through the optical circulator 30 and optical bandpass filter 38 is shifted in phase by π/2 with respect to the QPSK signal output from fourth input-output port 23-4 and optical bandpass filter 28, but may still be used for monitoring purposes as in the first embodiment.

The second embodiment produces essentially the same effects as described in the first embodiment, but has fewer optical components and can accordingly be manufactured at a lower cost. A further advantage of the second embodiment is that all returning signal light is used to produce the QPSK signals output from the optical bandpass filters 28, 38.

Third Embodiment

An m-ary modulator 1B representing a third embodiment of the invention will now be described. The third embodiment addresses a possible problem in the second embodiment.

Figure 10:
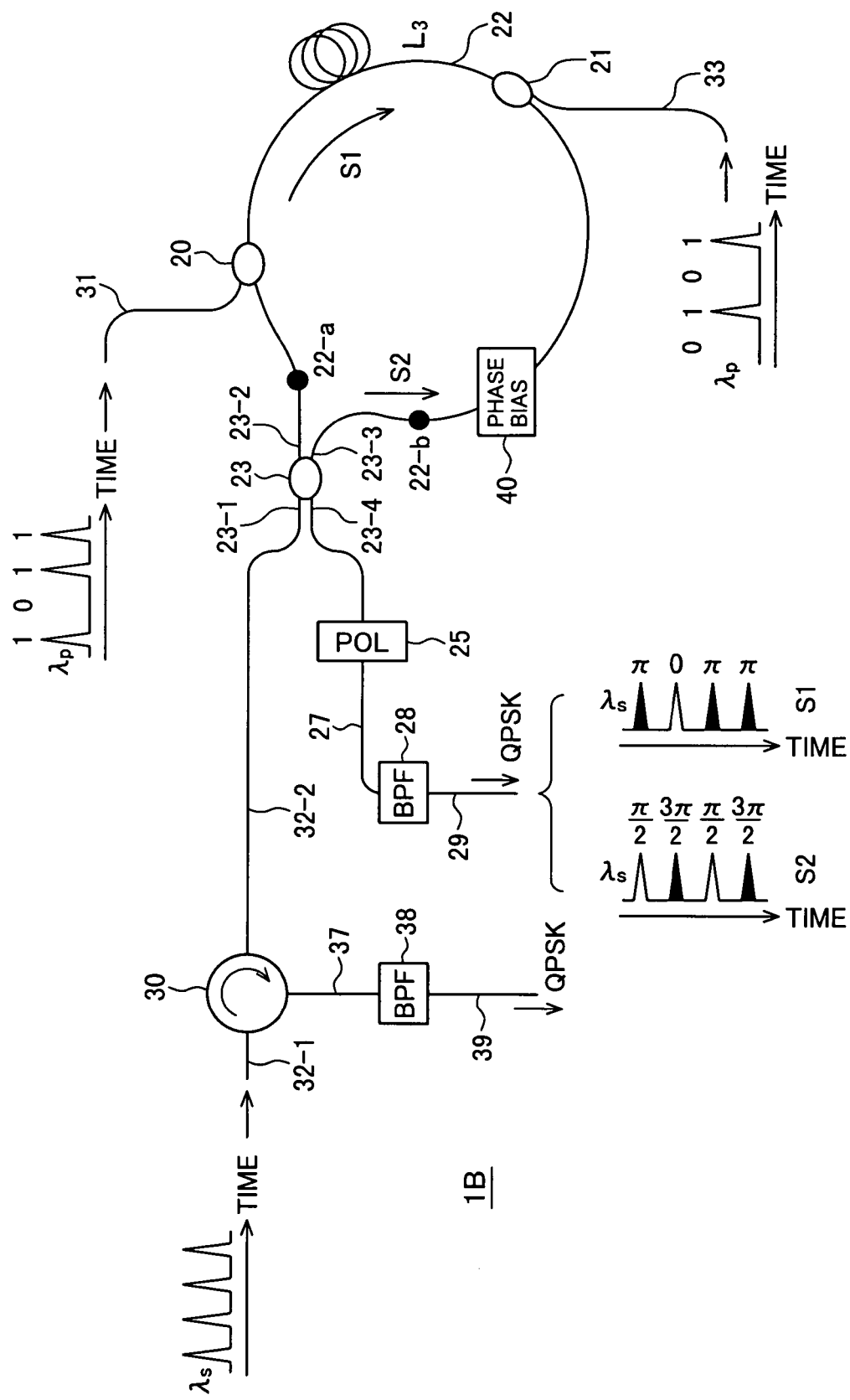
FIG. 10 schematically illustrates the structure of an optical m-ary modulator according to a third embodiment of the invention.

To the configuration of the optical m-ary modulator 1A of the second embodiment, shown in FIG. 8, the third embodiment adds a polarizer (POL) 25 shown in FIG. 10, disposed between fourth input-output port 23-4 of the polarization maintaining 3-dB coupler 23 and the optical bandpass filter 28. The polarizer 25 passes light polarized parallel to the slow axis of fourth input-output port 23-4 of the 23. The other constituent elements of the optical m-ary modulator 1B are the same as in the second embodiment.

The operation of the third embodiment will be described below, focusing on the difference from the second embodiment.

The problem that might appear in the second embodiment relates to polarization crosstalk components occurring in the polarization maintaining optical fiber 22.

No polarization maintaining optical fiber has a perfect polarization maintaining capability; as its length increases, its polarization maintaining capability decreases and polarization crosstalk appears. The crosstalk becomes significant when the length of the fiber exceeds about one hundred meters. In the embodiments described herein, the crosstalk takes the form of signal light polarized parallel to the fast axis of the polarization maintaining optical fiber 22.

As described in relation to the operation in the first embodiment, the anticipated length of the polarization maintaining optical fiber 22 is from several tens of meters to several kilometers. With such lengths of fiber, polarization crosstalk has been known to significantly degrade the stability of a conventional optical modulator employing a polarization interferometer, as disclosed by Arahira et al. in "Modified NOLM for Stable and Improved 2R Operation at Ultra-High Bit Rates", *IEICE Trans. Commun.*, Vol. E89-B, No. 12, pp. 3296-3305, 2006.

In the second embodiment, if the S1 and S2 components generate polarization crosstalk in the polarization maintaining optical fiber 22, the polarization crosstalk components enter the polarization maintaining 3-dB coupler 23 through input-output ports 23-2 and 23-3 together with the desired signal components, exit through input-output ports 23-1 and 23-4, and pass through the optical bandpass filters 28, 38. The optical phases of the polarization crosstalk components are not uniform, so the crosstalk components may disturb the waveform of the combined QPSK output signals, possibly creating an interference effect that varies randomly, resulting in unstable operation.

Imperfect optical axis adjustment at the junctions of the fiber pigtails of the polarization maintaining 3-dB coupler 23 with the polarization maintaining optical fiber 22 can also produce interference between the desired signal components and the polarization crosstalk components exiting the polarization maintaining 3-dB coupler 23 through input-output ports 23-1 and 23-4, resulting in unstable operation.

Since the polarization crosstalk components are polarized perpendicular to the polarization of the desired signal components, however, the interference can be removed by separating the differently polarized components.

In the third embodiment, the transmitting axis of the polarizer 25 is aligned with the slow axis of the fourth input-output port 23-4, which is parallel to the polarization direction of the desired optical signal components. Polarization crosstalk components generated in the polarization maintaining optical fiber 22, which are polarized parallel to the fast axis, are therefore blocked by the polarizer 25, reducing variation in the waveform of the output optical signal.

If necessary, a similar polarizer may be added on input-output optical fiber 32-2.

In addition to the effects of the second embodiment, the third embodiment provides improved operational stability by blocking polarization crosstalk components generated in the polarization maintaining optical fiber 22.

Fourth Embodiment

Figure 11:
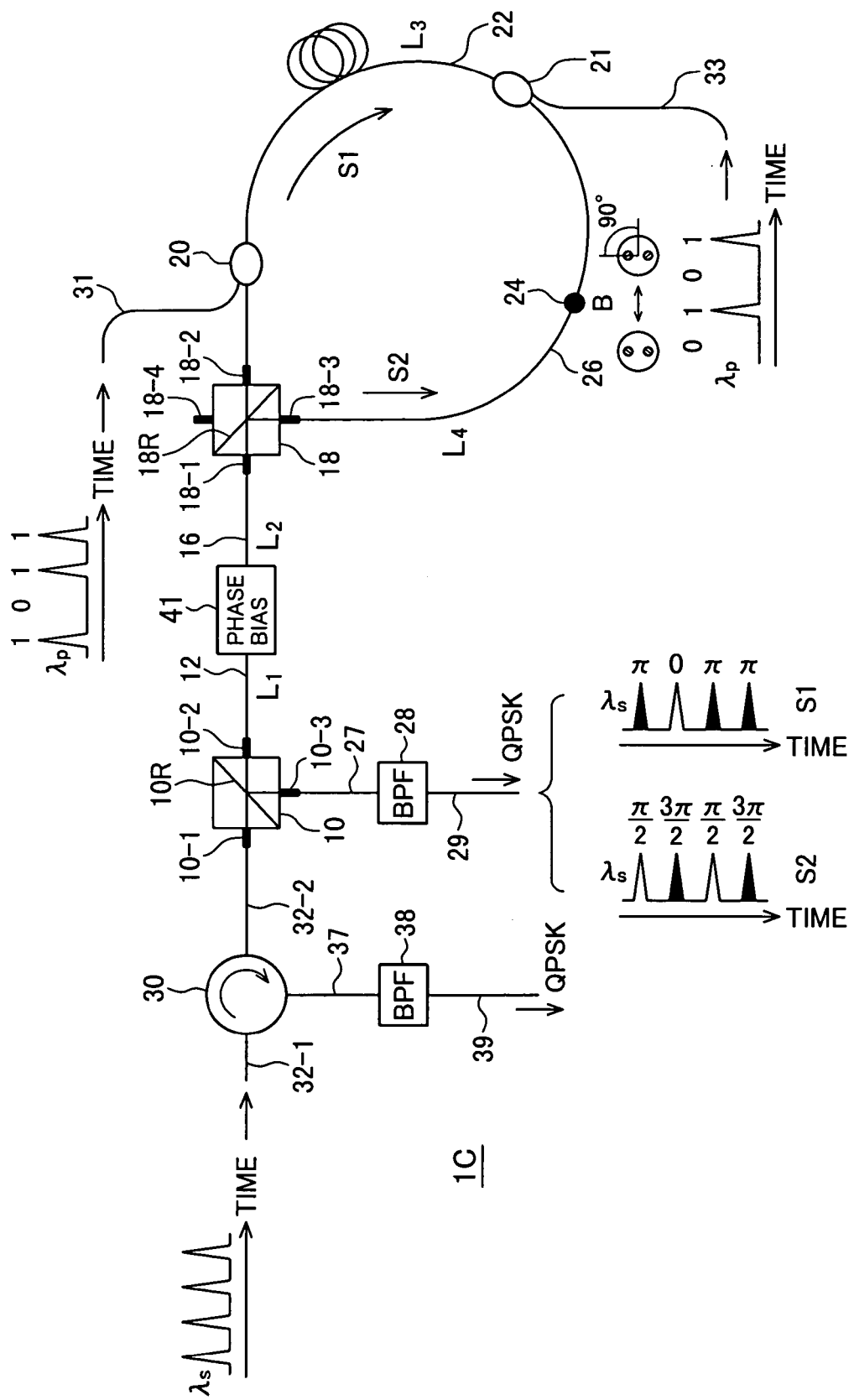
FIG. 11 schematically illustrates the structure of an optical m-ary modulator according to a fourth embodiment.

Referring to FIG. 11, the optical m-ary modulator 1C in the fourth embodiment is identical to the optical m-ary modulator in the first embodiment except that no optical phase bias unit is inserted in the optical loop; instead, an optical phase bias unit 41 is inserted between the first and second polarization maintaining optical fibers 12, 16, replacing the first polarization converter in the first embodiment.

Figure 12:
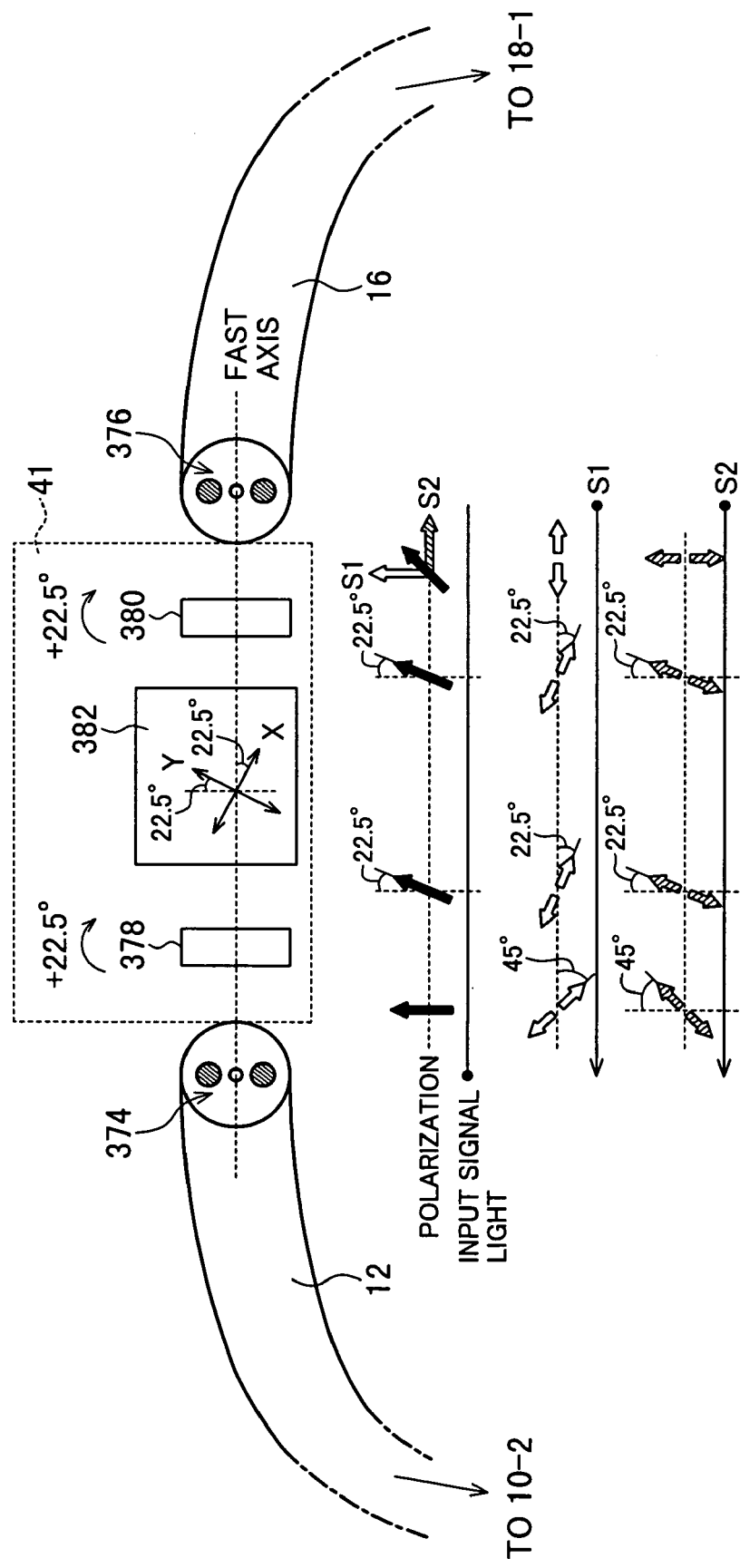
FIG. 12 schematically illustrates an exemplary structure of the optical phase bias unit in FIG. 11.

Referring to FIG. 12, the optical phase bias unit 41 comprises a pair of Faraday rotators 378, 380, each of which rotates the polarization plane of linearly polarized light by +22.5°, and a birefringent medium, more specifically a quarter wave plate 382, disposed between the Faraday rotators 378, 380, with X and Y axes oriented at 22.55° angles to the fast and slow axes of the first and second polarization maintaining optical fibers 12, 16. Light propagating through the optical phase bias unit 41 between the end 374 of the first polarization maintaining optical fiber 12 coupled to Faraday rotator 378 and the end 376 of the second polarization maintaining optical fiber 16 coupled to Faraday rotator 380 undergoes the following polarization rotations.

Light propagating from left to right in FIG. 12, polarized parallel to the slow axis of the first polarization maintaining optical fiber 12, has its polarization plane rotated +22.55° by Faraday rotator 378 so that it passes through the quarter wave plate 382 polarized parallel to the Y axis of the quarter wave plate 382. The polarization plane is then rotated by a further +22.5° in Faraday rotator 380, so that when the light enters the second polarization maintaining optical fiber 16 at end 376, it is polarized at a 45° angle to the slow axis of the second polarization maintaining optical fiber 16.

Light propagating from right to left in FIG. 12 may be polarized parallel to the fast or slow axis of the second polarization maintaining optical fiber 16. If the light is polarized parallel to the fast axis, after the +22.55° polarization plane rotation caused by Faraday rotator 380, the light passes through the quarter wave plate 382 polarized parallel to its X axis. If the light is polarized parallel to the slow axis of the second polarization maintaining optical fiber 16, then after the +22.55° polarization plane rotation caused by Faraday rotator 180, the light passes through the quarter wave plate 382 polarized parallel to its Y axis. In either case, the polarization plane is rotated by a further +22.5° in Faraday rotator 378, so that when the light reenters the first polarization maintaining optical fiber 12 at end 374, it is polarized at a 45° angle to the fast and slow axes of the first polarization maintaining optical fiber 12.

Referring again to FIG. 11, the fourth embodiment operates as follows.

Signal light enters the optical m-ary modulator 1C through the input optical fibers 32-1, 32-2 and optical circulator 30 and is coupled by the first polarization splitting-combining module 10 into the first polarization maintaining optical fiber 12. The input light propagates through the first polarization maintaining optical fiber 12 with its polarization plane parallel to the slow axis of the first polarization maintaining optical fiber 12. The polarization plane is rotated by 45° in the optical phase bias unit 41, so that the signal light propagates through the second polarization maintaining optical fiber 16 with its polarization plane oriented at a 45° angle to the slow axis of the second polarization maintaining optical fiber 16. As in the first embodiment, the second polarization splitting-combining module 18 splits the signal light into two components S1, S2 that travel in opposite directions around the optical loop comprising the third and fourth polarization maintaining optical fibers 22, 26.

As the S1 and S2 components travel around the optical loop, they are modulated by the first and second optical control signals so that they become BPSK signals. Because the optical loop in the fifth embodiment does not include an optical phase bias unit, the only phase modulation of the S1 and S2 components is the phase shift due to the first and second control signals. When the S1 and S2 components are coupled back into the second polarization maintaining optical fiber 16 by the second polarization splitting-combining module 18, the S1 component is polarized parallel to the fast axis of the second polarization maintaining optical fiber 16, and the S2 component is polarized parallel to the slow axis of the second polarization maintaining optical fiber 16.

Accordingly, when the light passes through the quarter wave plate 382 in the optical phase bias unit 41, the S1 component is polarized parallel to the X axis and the S2 component is polarized parallel to the Y axis. The birefringence of the optical phase bias unit 41 produces a relative phase difference between the S1 and S2 components equivalent one quarter wavelength, or a phase angle of $\pi/2$ radians.

After the further 22.5° polarization rotation given by the third Faraday rotator 378, the S1 and S2 components reenter the first polarization maintaining optical fiber 12 from the optical phase bias unit 41 in the states shown on the left in FIGS. 6C to 6F, polarized at 45° angles to the slow and fast axes of the first polarization maintaining optical fiber 12, just as in the first embodiment, and with the same $\pi/2$ mutual phase difference as produced by the optical phase bias unit in the first embodiment.

Subsequent operation proceeds as described in the first embodiment. A QPSK signal is output from input-output port 10-3 of the first polarization splitting-combining module 10 through optical bandpass filter 28, and a complementary QPSK signal is output with negative logic from the optical circulator 30 through optical bandpass filter 38.

The fourth embodiment provides the same effect as the first embodiment, but since the optical phase bias unit 41 carries out the functions of both the optical phase bias unit and the first polarization converter in the first embodiment, the optical m-ary modulator 1C in the fourth embodiment has fewer optical components, is smaller in size, and can be manufactured at a lower cost.

Fifth Embodiment

Figure 13:
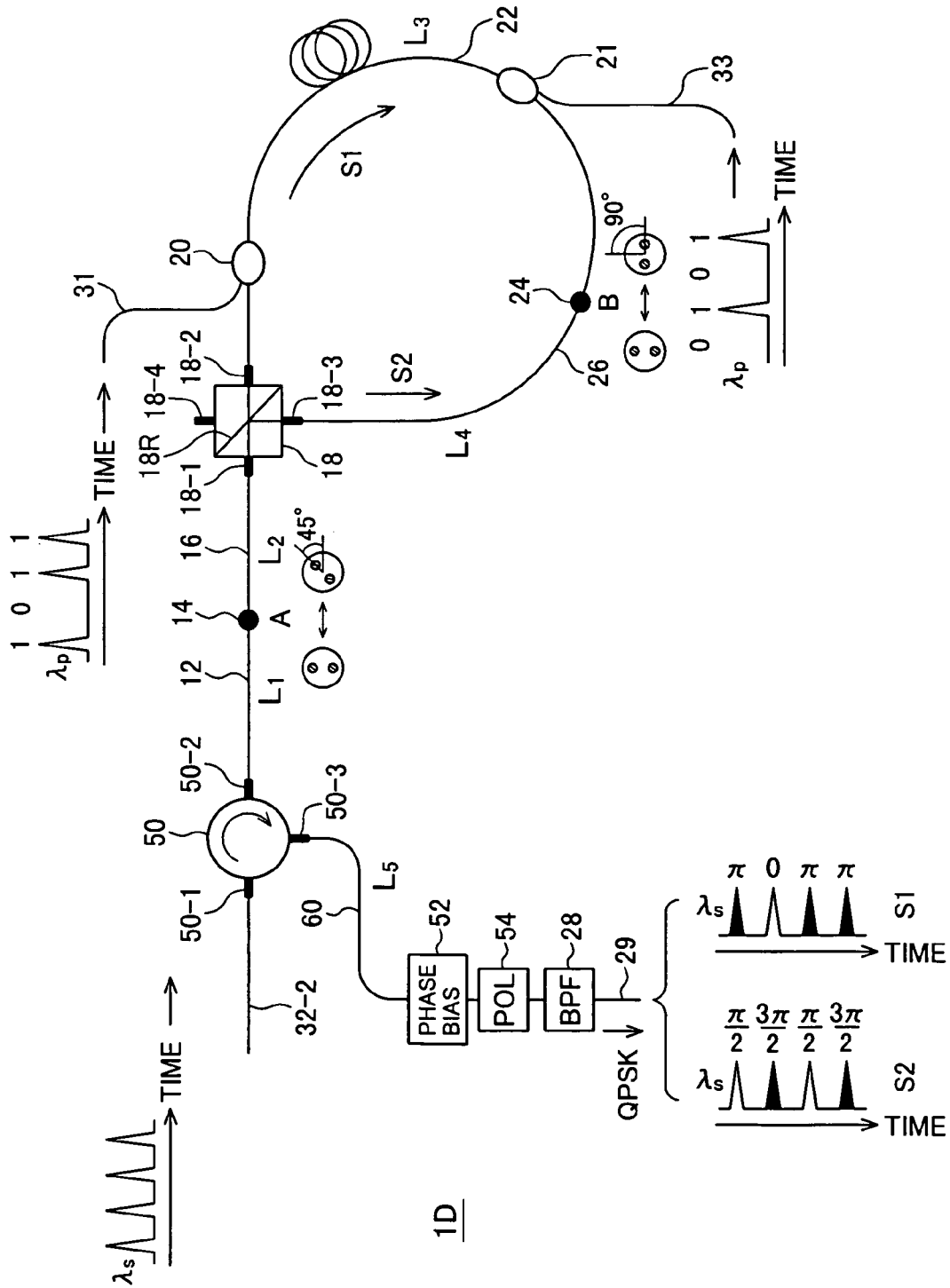
FIG. 13 schematically illustrates the structure of an optical m-ary modulator according to a fifth embodiment of the invention.

Referring to FIG. 13, the optical m-ary modulator 1D in the fifth embodiment has the same optical loop, the same polarization maintaining optical fibers 12, 16, 22, 26, and the same optical bandpass filter 28, output optical fiber 29, and input optical fiber 32-2 as in the fourth embodiment, but replaces the optical phase bias unit of the fourth embodiment, adds the first polarization converter 14 of the first embodiment, and replaces the other elements of the fourth embodiment with an optical circulator 50, a birefringent medium (a quarter wave plate) 52, a polarizer (POL) 54, and a fifth polarization maintaining optical fiber 60.

The optical circulator 50 has at least three input-output facets or ports 50-1 to 50-3. Linearly polarized light entering the optical circulator 50 at the first input-output facet or port 50-1 maintains its polarization and exits from the second input-output facet or port 50-2. Linearly polarized light entering at the second input-output facet or port 50-2 maintains its polarization and exits from third input-output facet or port 50-3. The optical circulator 50 must operate this way not just for light polarized in one particular plane, but for light polarized in two mutually orthogonal planes. The optical circulator 50 is preferably a polarization-independent optical circulator.

Polarization must be maintained not only within the optical circulator 50 but also in the interfaces through which the light enters and leaves the optical circulator 50. If the optical circulator 50 includes optical fiber pigtails on its input-output ports, the fiber pigtails are preferably made of polarization maintaining optical fibers with the alignment of their fast and slow axes adjusted so that incident light polarized at a given angle to the slow axis of the fiber pigtail on the input port leaves with the same angle between its polarization plane and the slow axis of the fiber pigtail on the output port. In the following description it will be tacitly assumed that all three input-output ports of the optical circulator 50 have polarization maintaining optical fiber pigtails with fast and slow axes aligned in this way, and the fast and slow axes of the assumed pigtails will be referred to as the fast and slow axes of the ports to which they are connected.

The optical fiber 32-2 described above is coupled to the first input-output port 50-1 of the optical circulator 50. The first polarization maintaining optical fiber 12 connected to the first polarization converter 14 is coupled to the second input-output port 50-2, with the slow axes of second input-output port 50-2 and the first polarization maintaining optical fiber 12 mutually aligned.

The fifth polarization maintaining optical fiber 60 has the same length as the first polarization maintaining optical fiber 12. One end of the fifth polarization maintaining optical fiber 60 is coupled to the third input-output port 50-3 of the optical circulator 50 in such a way that the slow axis of the fifth polarization maintaining optical fiber 60 is aligned with the fast axis of the third input-output port 50-3 and the fast axis of the fifth polarization maintaining optical fiber 60 is aligned with the slow axis of third input-output port 50-3. The slow axes of the first polarization maintaining optical fiber 12 and third input-output port 50-3 are therefore mutually orthogonal.

Figure 14:
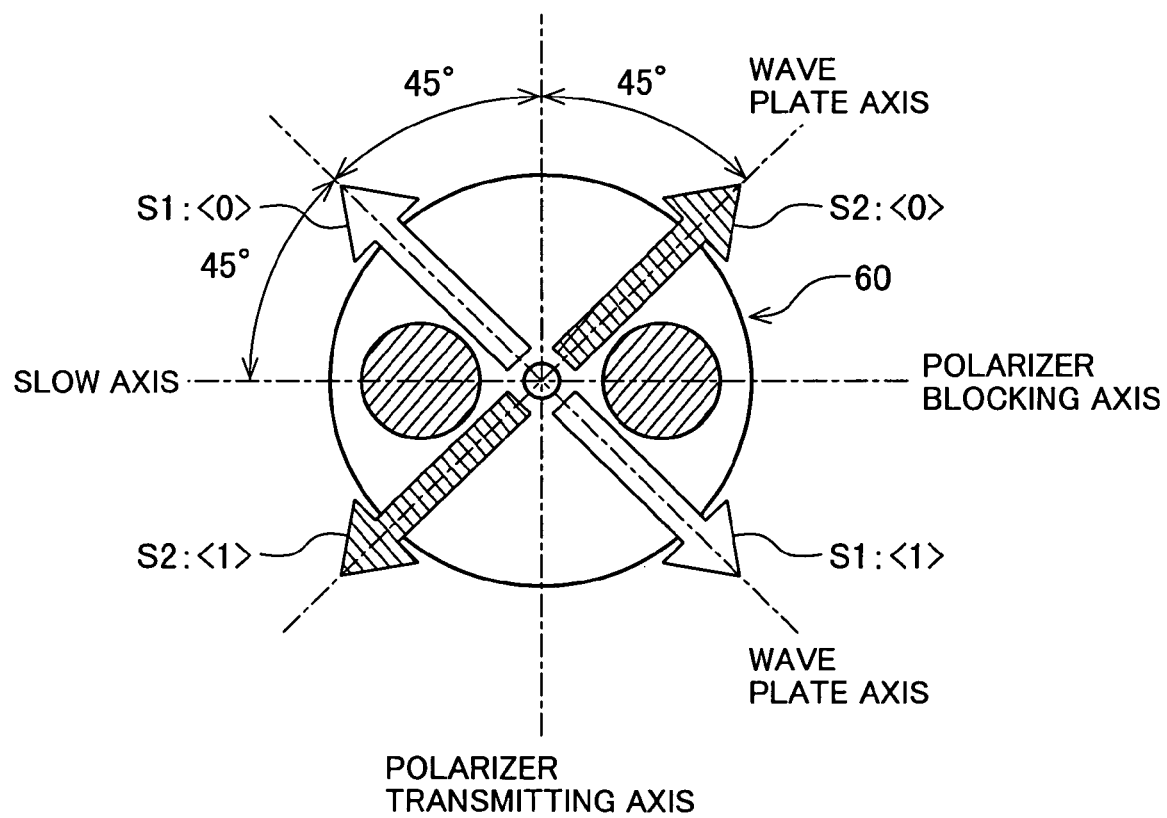
FIG. 14 schematically illustrates the components of modulated signal light propagating from the optical circulator toward the quarter wave plate and polarizer in FIG. 13.

The quarter wave plate 52 is coupled to the other end of the fifth polarization maintaining optical fiber 60. The optical axes of the quarter wave plate 52 are oriented at a 45° angle to the fast and slow axes of the fifth polarization maintaining optical fiber 60, as illustrated in FIG. 14.

The polarizer 54 is coupled between the quarter wave plate 52 and the optical bandpass filter 28. The transmitting axis of the polarizer 54 is aligned at a 45° angle to the optical axes of the quarter wave plate 52.

The fifth embodiment operates as follows.

Signal light enters the optical m-ary modulator 1D through the input optical fiber 32-2 with its polarization plane aligned parallel to the slow axis of input-output port 50-1 of the optical circulator 50. This polarization is maintained as the light propagates through the optical circulator 50, so the light exits with its polarization plane aligned parallel to the slow axis of input-output port 50-2. Since the slow axes of this input-output port 50-2 and the first polarization maintaining optical fiber 12 are aligned, the signal light propagates through the first polarization maintaining optical fiber 12 with its polarization plane aligned parallel to the slow axis of the first polarization maintaining optical fiber 12 and arrives at the first polarization converter 14 in this state, as illustrated at the left in FIG. 6B.

After passing through the first polarization converter 14 and second polarization maintaining optical fiber 16, traversing the optical loop including the third polarization maintaining optical fiber 22, and returning through the second polarization maintaining optical fiber 16, the S1 and S2 components of the signal light arrive back at the first polarization converter 14 polarized and phase-modulated as explained in the first embodiment and illustrated in FIGS. 6C to 6F. Because the optical loop in the fifth embodiment does not include an optical phase bias unit, the only phase modulation of the S1 and S2 components is the phase shift due to the first and second optical control signals.

The S1 and S2 components propagate through the first polarization maintaining optical fiber 12, optical circulator 50, and fifth polarization maintaining optical fiber 60 to the quarter wave plate 52. The polarization planes of the S1 and S2 components are now oriented at 45° angles to the fast and slow axes of the first polarization maintaining optical fiber 12, as illustrated on the left in FIGS. 6C to 6F, and this polarization angle is maintained in the optical circulator 50 and fifth polarization maintaining optical fiber 60. The S1 and S2 components are accordingly affected by the birefringence of the first polarization maintaining optical fiber 12 and the fifth polarization maintaining optical fiber 60, but because the slow axis of the first polarization maintaining optical fiber 12 is aligned with the slow axis of second input-output port 50-2 of the optical circulator 50 and the slow axis of the fifth polarization maintaining optical fiber 60 is orthogonal to the slow axis of third input-output port 50-3 of the optical circulator 50, and because the first polarization maintaining optical fiber 12 and fifth polarization maintaining optical fiber 60 have equal lengths, the birefringence effects in the first polarization maintaining optical fiber 12 and the fifth polarization maintaining optical fiber 60 cancel out. Consequently, the S1 and S2 components leave the fifth polarization maintaining optical fiber 60 with no relative optical phase differences due to the birefringence of the polarization maintaining optical fibers.

As the optical axes of the quarter wave plate 52 are oriented at 45° angles to the fast and slow axes of the fifth polarization maintaining optical fiber 60, when the signal light passes through the quarter wave plate 52, the S1 component is polarized parallel to one axis of the quarter wave plate 52 and the S2 is polarized parallel to the other axis of the quarter wave plate 52. Passage through the quarter wave plate 52 therefore produces a relative phase difference between the S1 and S2 components equivalent one quarter wavelength, or a phase angle of π/2 radians.

After passing through the quarter wave plate 52, the S1 and S2 components pass through the polarizer 54, the transmitting optical axis of which is oriented at a 45° angle to the X and Y axes of the quarter wave plate 52, and thus at a 45° angle to the polarization planes of the S1 and S2 components. Both of the S1 and S2 components pass through the polarizer 54, although each is attenuated by fifty percent.

Upon entering the polarizer 54, the S1 and S2 components are both BPSK optical signals with a phase difference of π between '1' and '0' pulses, but there is also a phase difference of π/2 between the S1 and S2 components produced by the quarter wave plate 52. The S1 and S2 components therefore leave the polarizer 54 as a combined QPSK optical signal with phases representing four possible two-bit data values, as described in the first embodiment.

Because it requires no optical phase bias unit with Faraday rotators, the optical m-ary modulator 1D in the fifth embodiment can be fabricated at a reduced cost, while providing substantially the same effect as the m-ary optical modulators in the preceding embodiments.

In a variation of the fifth embodiment, the first and fifth polarization maintaining optical fibers 12, 60 are replaced by free-space optical paths, which need not be of equal length.

In another variation of the fifth embodiment, the polarizer 54 is replaced with a polarization splitting-combining module similar to the second polarization splitting-combining module 18 to provide two complementary output signals with positive and negative logic.

The medium in which optical phase modulation takes place is not limited to the third polarization maintaining optical fiber 22 used in the embodiments above, and the phase modulation mechanism is not limited to the optical Kerr effect. The invention can be practiced with a wide variety of optical devices in which the phase of signal light can be modulated by use of control light. At comparatively low bit rates such as 1 Gbps, for example, a semiconductor optical amplifier or an electric field absorption optical modulator may be used. Alternatively, a silicon wire waveguide having a silicon core and an $SiO_2$ clad may be used.

Those skilled in the art will recognize that further variations are possible within the scope of the invention, which is defined in the appended claims.

What is claimed is:

1. An optical m-ary modulator, comprising:
   an optical loop forming a polarization maintaining closed loop path;
   a loop input-output unit for receiving linearly polarized input signal light, splitting the input signal light into a first signal component and a second signal component, the first signal component and the second signal component also being linearly polarized, feeding the first signal component and the second signal component into the optical loop in mutually opposite directions, and recombining the first signal component and the second signal component after the first signal component and the second signal component have traveled around the optical loop to generate a returning optical signal including the first signal component and the second signal component;
   a first phase modulator disposed in the optical loop, for modulating an optical phase of the first signal component responsive to a first control signal representing a first binary data sequence;
   a second phase modulator disposed in the optical loop, for modulating an optical phase of the second signal component responsive to a second control signal representing a second binary data sequence; and
   an optical phase bias unit optically connected to the loop input-output unit, for creating a relative optical phase difference between the first signal component and the second signal component; wherein
      after the first signal component and the second signal component have passed through the optical phase bias unit and been recombined into the returning optical signal, the returning optical signal is output as an m-ary modulated optical signal;
      the first control signal and the second control signal are intensity modulated linearly polarized optical signals differing in wavelength from the input signal light;
      the optical loop includes a nonlinear polarization maintaining optical fiber;
      the first phase modulator includes a first optical coupler for inserting the first control signal into the nonlinear polarization maintaining optical fiber so that the first control signal and the first signal component propagate in identical directions through the nonlinear polarization maintaining optical fiber and the first control signal modulates the first signal component by an optical Kerr effect; and
   the second phase modulator includes a second optical coupler for inserting
      the second control signal into the nonlinear polarization maintaining optical fiber so that the second control signal and the second signal component propagate in identical directions through the nonlinear polarization maintaining optical fiber and the second control signal modulates the second signal component by the optical Kerr effect.

2. The optical m-ary modulator of claim 1, wherein the input signal light comprises an optical pulse train with equally-spaced optical pulses of uniform peak intensity.

3. The optical m-ary modulator of claim 1, further comprising an optical bandpass filter for removing the first and second control signals from the returning optical signal.

4. The optical m-ary modulator of claim 1, wherein the loop input-output unit comprises a polarization maintaining two-by-two three-decibel coupler.

5. An optical m-ary modulator, comprising:
   an optical loop forming a polarization maintaining closed loop path;
   a loop input-output unit for receiving linearly polarized input signal light, splitting the input signal light into a first signal component and a second signal component, the first signal component and the second signal component also being linearly polarized, feeding the first signal component and the second signal component into the optical loop in mutually opposite directions, and recombining the first signal component and the second signal component after the first signal component and the second signal component have traveled around the optical loop to generate a returning optical signal including the first signal component and the second signal component;
   a first phase modulator disposed in the optical loop, for modulating an optical phase of the first signal component responsive to a first control signal representing a first binary data sequence;
   a second phase modulator disposed in the optical loop, for modulating an optical phase of the second signal component responsive to a second control signal representing a second binary data sequence; and an optical phase bias unit optically connected to the loop input-output unit, for creating a relative optical phase difference between the first signal component and the second signal component; wherein after the first signal component and the second signal component have passed through the optical phase bias unit and been recombined into the returning optical signal, the returning optical signal is output as an m-ary modulated optical signal;

the optical phase bias unit is inserted into the optical loop; and the optical phase bias unit further comprises:
a pair of polarization rotators producing equal and opposite polarization rotations; and
a birefringent medium disposed between the pair of polarization rotators.

6. An optical m-ary modulator, comprising:

an optical loop forming a polarization maintaining closed loop path;

a loop input-output unit for receiving linearly polarized input signal light, splitting the input signal light into a first signal component and a second signal component, the first signal component and the second signal component also being linearly polarized, feeding the first signal component and the second signal component into the optical loop in mutually opposite directions, and recombining the first signal component and the second signal component after the first signal component and the second signal component have traveled around the optical loop to generate a returning optical signal including the first signal component and the second signal component;

a first phase modulator disposed in the optical loop, for modulating an optical phase of the first signal component responsive to a first control signal representing a first binary data sequence;

a second phase modulator disposed in the optical loop, for modulating an optical phase of the second signal component responsive to a second control signal representing a second binary data sequence; and an optical phase bias unit optically connected to the loop input-output unit, for creating a relative optical phase difference between the first signal component and the second signal component; wherein after the first signal component and the second signal component have passed through the optical phase bias unit and been recombined into the returning optical signal, the returning optical signal is output as an m-ary modulated optical signal;

the loop input-output unit comprises a polarizing beam splitter-combiner or a polarizing prism; and the optical loop further comprises a pair of polarization maintaining optical fibers, each having a fast axis and a slow axis, the pair of polarization maintaining optical fibers being optically interconnected so that the first signal component and the second signal component propagate polarized parallel to the slow axis of one polarization maintaining optical fiber in the pair of polarization maintaining optical fibers, and propagate polarized parallel to the fast axis of another polarization maintaining optical fiber in the pair of polarization maintaining optical fibers.

7. An optical m-ary modulator, comprising:

an optical loop forming a polarization maintaining closed loop path;

a loop input-output unit for receiving linearly polarized input signal light, splitting the input signal light into a first signal component and a second signal component, the first signal component and the second signal component also being linearly polarized, feeding the first signal component and the second signal component into the optical loop in mutually opposite directions, and recombining the first signal component and the second signal component after the first signal component and the second signal component have traveled around the optical loop to generate a returning optical signal including the first signal component and the second signal component;

a first phase modulator disposed in the optical loop, for modulating an optical phase of the first signal component responsive to a first control signal representing a first binary data sequence;

a second phase modulator disposed in the optical loop, for modulating an optical phase of the second signal component responsive to a second control signal representing a second binary data sequence;

an optical phase bias unit optically connected to the loop input-output unit, for creating a relative optical phase difference between the first signal component and the second signal component; and an optical path separator optically coupled to the loop input-output unit by an optical input-output path on which the input signal light enters the loop input-output unit and the returning optical signal leaves the loop input-output unit, the optical path separator being operable to separate the returning optical signal from the optical input-output path; wherein after the first signal component and the second signal component have passed through the optical phase bias unit and been recombined into the returning optical signal, the returning optical signal is output as an m-ary modulated optical signal;

the loop input-output unit comprises a polarizing beam splitter-combiner or a polarizing prism; and the optical phase bias unit is disposed on the optical input-output path, and the optical phase bias unit is also operable to rotate a plane of polarization of the input signal light, and to rotate planes of polarization of the first signal component and the second signal component in the returning optical signal.

8. The optical m-ary modulator of claim 7, wherein the optical path separator comprises a polarizing beam splitter or a polarizing prism.

9. The optical m-ary modulator of claim 7, further comprising a polarization converter disposed on the optical input-output path, for rotating a plane of polarization of the input signal light, and for rotating planes of polarization of the first signal component and the second signal component in the returning optical signal.

10. The optical m-ary modulator of claim 7, wherein the optical phase bias unit comprises:
a pair of polarization rotators producing mutually identical polarization rotations, and;
a birefringent medium disposed between the pair of polarization rotators.

11. An optical m-ary modulator, comprising:

an optical loop forming a polarization maintaining closed loop path;

a loop input-output unit for receiving linearly polarized input signal light, splitting the input signal light into a first signal component and a second signal component, the first signal component and the second signal component also being linearly polarized, feeding the first signal component and the second signal component into the optical loop in mutually opposite directions, and recombining the first signal component and the second signal component after the first signal component and the second signal component have traveled around the optical loop to generate a returning optical signal including the first signal component and the second signal component;

a first phase modulator disposed in the optical loop, for modulating an optical phase of the first signal component responsive to a first control signal representing a first binary data sequence;

a second phase modulator disposed in the optical loop, for modulating an optical phase of the second signal component responsive to a second control signal representing a second binary data sequence;

an optical phase bias unit optically connected to the loop input-output unit, for creating a relative optical phase difference between the first signal component and the second signal component; and an optical path separator optically coupled to the loop input-output unit by an optical input-output path on which the input signal light enters the loop input-output unit and the returning optical signal leaves the loop input-output unit, the optical path separator being operable to separate the returning optical signal from the optical input-output path; wherein after the first signal component and the second signal component have passed through the optical phase bias unit and been recombined into the returning optical signal, the returning optical signal is output as an m-ary modulated optical signal;

the loop input-output unit comprises a polarizing beam splitter-combiner or a polarizing prism;

the optical path separator comprises an optical circulator; and the optical phase bias unit is optically connected to the optical circulator and receives the returning optical signal from the optical circulator.

12. The optical m-ary modulator of claim 11, wherein the optical phase bias unit comprises a birefringent medium.

13. The optical m-ary modulator of claim 12, further comprising a polarizer for transmitting the returning optical signal.

* * * * *